United States Patent [19]

Gladd et al.

[11] 4,136,608

[45] Jan. 30, 1979

[54] SYSTEM FOR PROCESSING MEAT

[75] Inventors: Andrew J. Gladd, Northville; Andrew Gladd, Jr., Livonia; Ralph J. MacKay, Novi, all of Mich.

[73] Assignee: Gladd Industries, Inc., Detroit, Mich.

[21] Appl. No.: 745,707

[22] Filed: Nov. 29, 1976

Related U.S. Application Data

[63] Continuation-in-part of Ser. No. 658,203, Feb. 17, 1976, abandoned.

[51] Int. Cl.$^2$ ............................................. A23B 4/04
[52] U.S. Cl. ........................................ 99/476; 99/335; 99/352; 99/443 C; 99/484; 198/750; 198/773; 212/11
[58] Field of Search ..................... 99/335, 443 C, 352, 99/361, 470, 484, 476–477; 198/772–774, 750, DIG. 952; 62/266, 408, 413; 98/36; 74/40, 44, 45; 254/113–114, 124; 214/392–394, 730, 95 R; 212/11, 14

[56] References Cited

U.S. PATENT DOCUMENTS

| | | | |
|---|---|---|---|
| 2,138,886 | 12/1938 | Schramm | 212/11 |
| 3,115,818 | 12/1963 | Smith | 98/36 |
| 3,747,510 | 7/1973 | Gladd | 99/443 C |

Primary Examiner—Harvey C. Hornsby
Assistant Examiner—Timothy F. Simone
Attorney, Agent, or Firm—Reising, Ethington, Barnard, Perry & Brooks

[57] ABSTRACT

An elongated meat processing system including an improved lifting mechanism for lifting products from a conveyor during conveyance through a treatment zone defined by a housing of the system so as to control the rate of advancement of the products and the time the products are present in the treatment zone. The system preferably includes a plurality of the conveyors arranged in a vertically spaced relationship with each of these conveyors being of a reciprocating type including a pair of laterally spaced reciprocating beams that carry product sticks on which the products are hung. The lifting mechanism includes laterally spaced lifters along the length of the system for lifting the products after forward reciprocation of the conveyor beams so the products are suspended and do not move rearwardly during subsequent rearward beam reciprocation. Prior to a subsequent forward reciprocation, the lifters return the products to the beams to provide product advancement. Elongated control members are pivotally supported along their lengths extending laterally between the laterally spaced lifters to provide coordination of the lifters. Actuators located at one side of the conveyors pivot the control members to operate the lifters.

22 Claims, 19 Drawing Figures

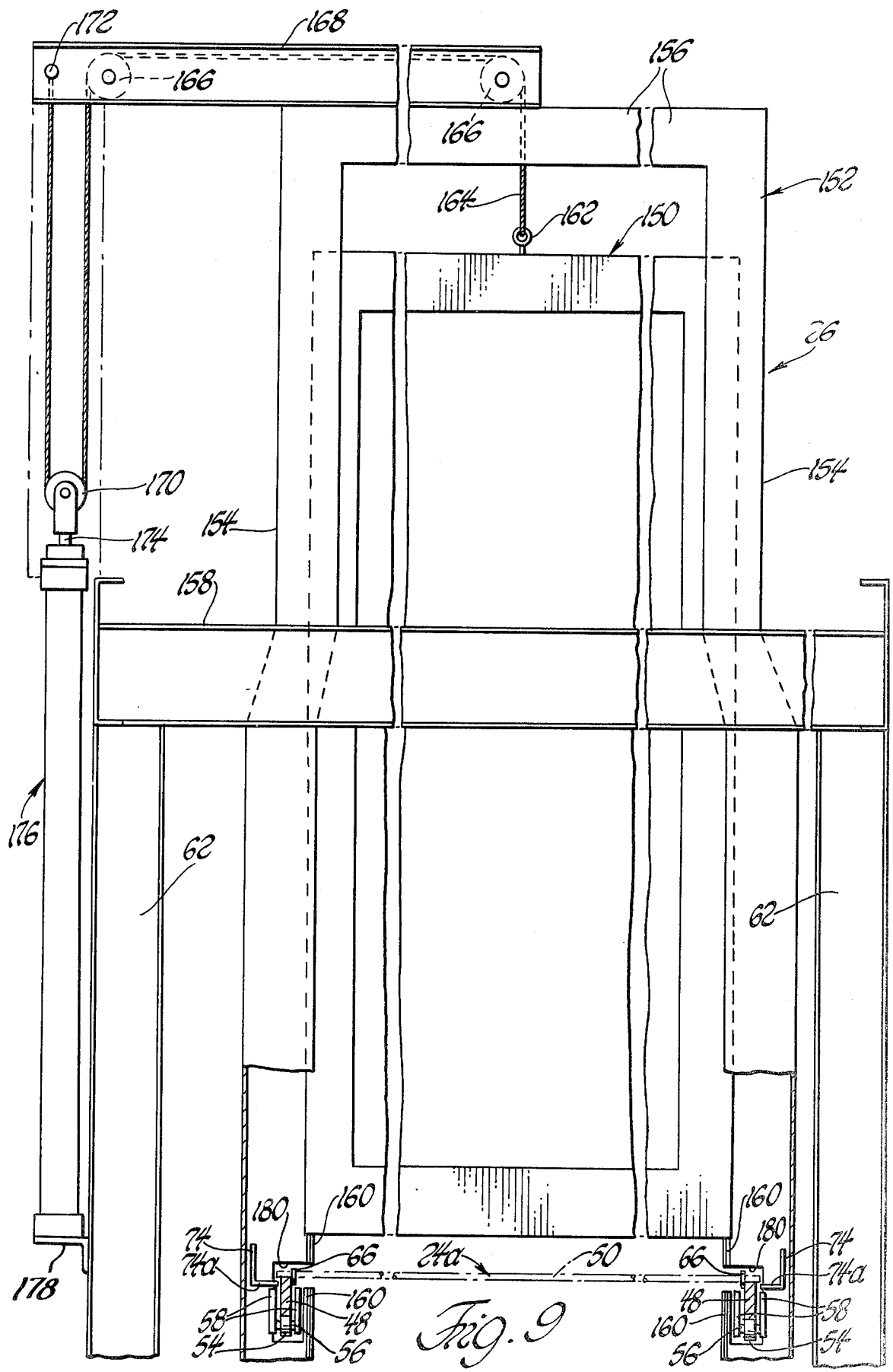

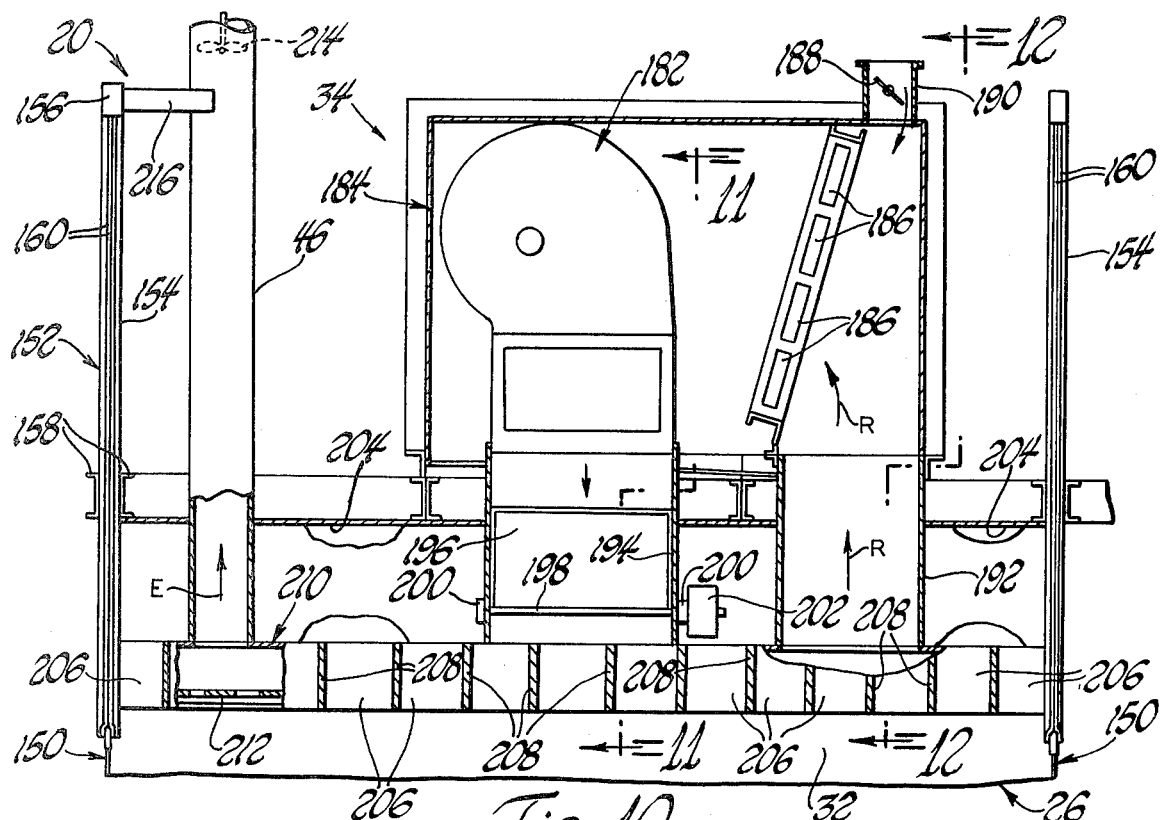
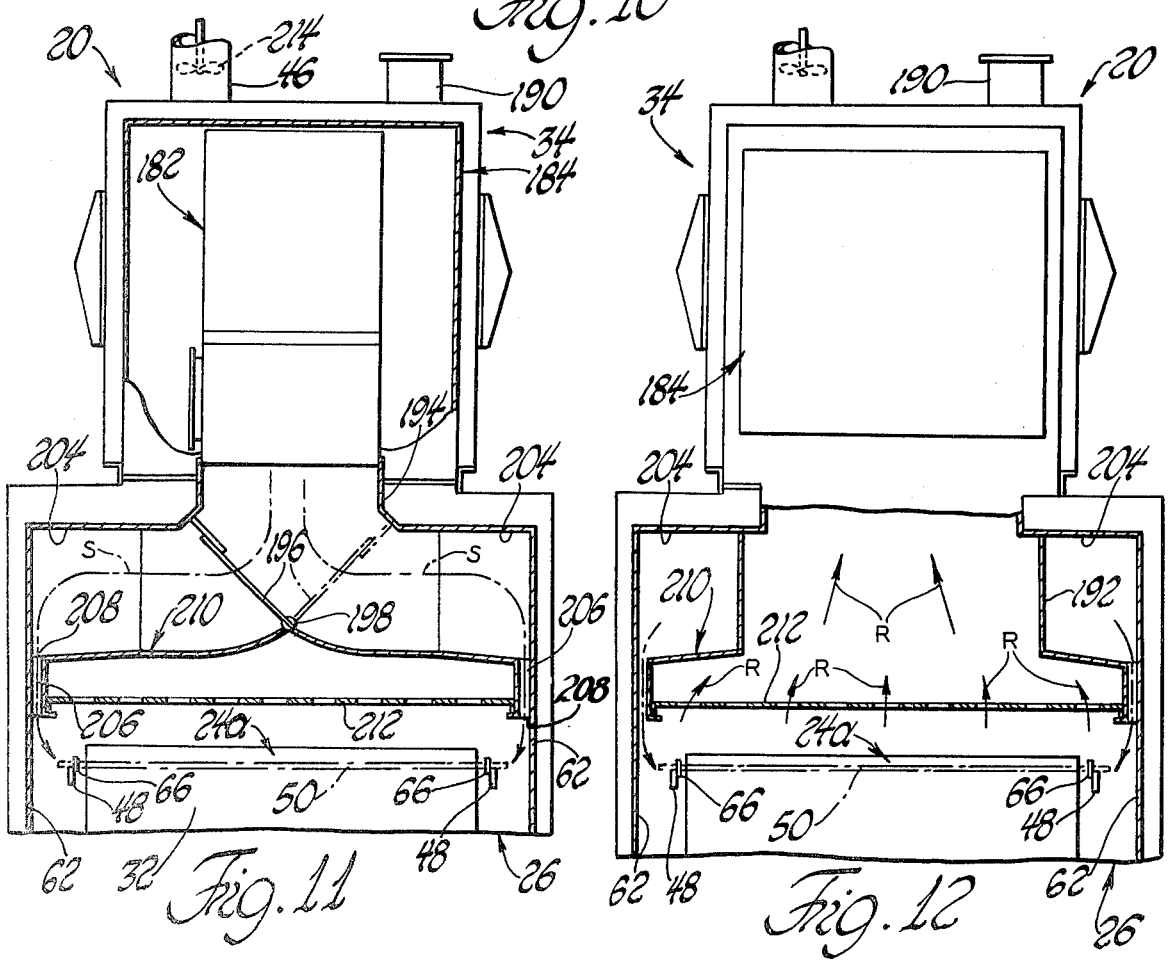

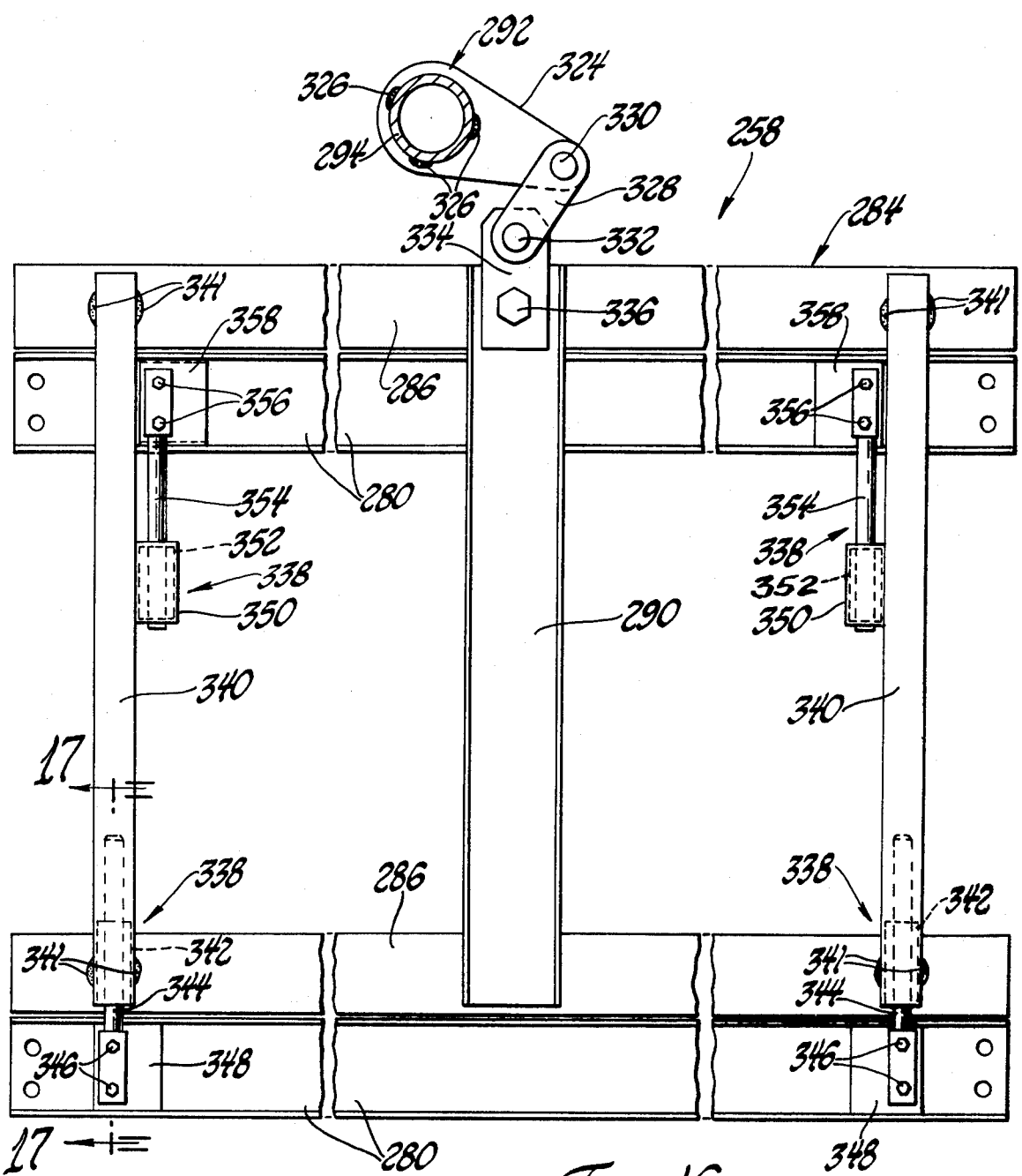
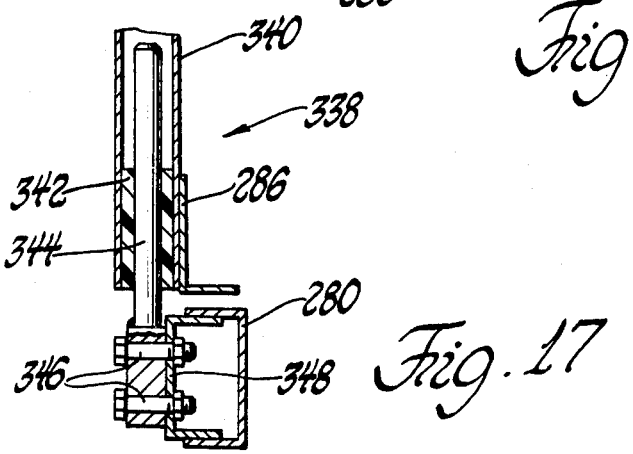
Fig. 16
Fig. 17

SYSTEM FOR PROCESSING MEAT

This application is a continuation-in-part of application Ser. No. 658,203, filed on Feb. 17, 1976, assigned to the assignee of this invention and abandoned on the day this application was accorded a filing date.

BACKGROUND OF THE INVENTION

1. Field of the Invention

The present invention is directed toward an elongated meat processing system that includes an improved lifting mechanism for lifting products being processed from one or more conveyors during movement through a treatment zone defined by a housing of the system so as to thereby control the rate of advancement of the products and the time the products are present in the treatment zone.

2. Description of the Prior Art

U.S. Pat. No. 3,747,510, which is assigned to the assignee of the present invention, discloses an elongated meat processing system for processing meat or the like. This type of processing requires the meat products, such as poultry, bacon, ham, weiners, sausage, frankfurters, etc., to be processed at various temperatures for varying periods of time depending on the particular product. The meat processing system of this patent conveys the products through different treatment zones and includes lifting means for lifting the products within the treatment zones for the required periods of time to provide proper processing. Adjacent treatment zones are separated from each other by movable doors in this system so as to maintain the proper temperatures, humidities and other conditions for curing, cooking, showering to cleanse the products, and chilling, as well as other types of processing.

The preferred embodiment of the meat processing system disclosed by the patent mentioned in the preceding paragraph includes a plurality of vertically spaced conveyors. Each of these conveyors includes a pair of laterally spaced, reciprocating beams extending the length of the system. Hydraulic actuators respectively associated with the reciprocating beams provide the impetus for beam reciprocation in forward and rearward directions. After forward beam reciprocation, a lifting mechanism of the system lifts product sticks from the beams so that products carried by these sticks remain suspended within the treatment zone during subsequent rearward reciprocation of the beams. Prior to the next forward beam reciprocation, the lifting mechanism returns the product sticks to the beams for subsequent advancement. This type of conveyance allows slower cooking products such as hams to immediately follow faster cooking products such as weiners. The slower moving hams are maintained suspended within the treatment zones by the lifting mechanism during one or more forward and rearward reciprocations of the beams while the weiners are advanced by each forward stroke so as to move at the required speed through the system. Thus, there is an efficient utilization of the system to provide a high output of processed products.

The lifting mechanism which lifts the product sticks from the conveyors in the aforementioned patent includes hydraulic actuators located at the upper side of the treatment zones along the length of the system. These actuators are connected to yokes that carry lifting arms. The actuators move the yokes upwardly to raise the lifting arms and to thereby lift the product sticks from the reciprocating beams of the conveyors.

SUMMARY OF THE INVENTION

An object of the present invention is to provide an elongated meat processing system including an improved lifting mechanism for lifting products from a conveyor within one or more treatment zones defined by a housing of the system and for returning the lifted products to the conveyor in a manner that provides advancement of the products during the processing.

Another object of the invention is to provide such an elongated meat processing system having a gas circulator that can be located immediately over the upper extremity of a treatment zone due to the construction of the lifting mechanism so as to reduce the total height of the system and thereby facilitate its installation within pre-existing buildings.

In connection with the preceding objects, another object of the invention is to provide such a meat processing system in which the conveyor includes reciprocating beams that move through openings of the housing between adjacent treatment zones and in which the gas circular provides an exhaust suction communicated with these beam openings to prevent gas flow between the different treatment zones.

In carrying out the above objects, as well as other objects of the invention, preferred embodiments of the elongated meat processing system each include a plurality of aligned treatment zones in which the products are processed. Vertically spaced conveyors convey the products being processed through the treatment zones. Each of these conveyors includes a pair of laterally spaced forwardly and rearwardly reciprocating beams on which the products being processed are carried by product sticks that extend between the beams. Laterally spaced lifters of the lifting mechanism are positioned along the length of the system within the treatment zones on opposite sides of the conveyors. Each lifter includes lifting arms located in respective alignment with the conveyor beams. Elongated control members are pivotally supported along their lengths and extend laterally between the laterally spaced lifters to coordinate operation of the lifters. Actuators respectively connected to the control members provide pivotal movement thereof to operate the lifters. Pivotal control member movement in one direction raises the lifting arms of the lifters from a first position to a second position to lift products from the conveyor beams after a forward reciprocation of the beams. Subsequent to a rearward reciprocation of the beams, pivotal control member movement in the other direction lowers the lifting arms from the second position to the first position to return the lifted products to the beams ready for another forward reciprocation and consequent advancement through the treatment zones. The control members are loaded in a torsional mode during operation of the lifters and the actuators are located to one side of the conveyors such that the space at the upper sides of the treatment zones is not obstructed. Trailing products requiring longer processing time within the treatment zones can be maintained suspended during one or more forward and rearward beam reciprocations as the leading products are raised and lowered to be advanced through the treatment zones.

In one preferred embodiment of the meat processing system, the laterally spaced lifters of the lifting mechanism include parallelogram linkages with lower links that provide the lifting arms for raising and lowering the products from the conveyor beams. Vertical control links extend between the vertically spaced lifting arms of each lifter to coordinate their upward and downward movement. The control member associated with each pair of laterally aligned lifters is connected to the uppermost parallelogram linkage of each lifter to actuate its movement while the control link thereof moves the other linkages.

The parallelogram linkage embodiment of the meat processing system also includes a conveyor drive mechanism having a common drive member that is connected to each of the reciprocable conveyor beams and to a drive actuator. Preferably, the drive actuator is embodied as a reciprocating cylinder and the drive member has a generally U-shaped configuration. Vertical legs of the drive member are connected to the reciprocating beams and a horizontal base extends between the vertical legs and is connected with the reciprocating cylinder. The cylinder is actuated in one direction to reciprocate the drive member and the beams connected thereto in a forward direction and is actuated in the opposite direction to reciprocate the beams in a rearward direction.

In another preferred embodiment of the meat processing system, the lifters of the lifting mechanism include lifting arms that are supported by vertical guides for upward and downward movement. A vertical support member is fixedly connected to the vertically spaced lifting arms of each lifter to coordinate their upward and downward movement. Crank arms of the associated laterally extending control member are preferably utilized to connect the support members of the laterally spaced lifters in order to actuate upward and downward movement of the lifting arms. Each conveyor beam of this embodiment is driven by a separate associated cylinder for forward and rearward reciprocation. The drive cylinders are preferably located at the exit end of the system such that the beams are in tension when carrying the products being processed forwardly.

In each of the preferred embodiments, the reciprocating beams include respective positioning members defining openings for receiving and positioning the sticks on which the products being processed are supported. The positioning members are detachably secured to the beams so that these members can be replaced by other positioning members whose stick receiving openings are spaced at a different distance from each other as may be required by the particular products being processed. Also, the control members interconnecting the laterally spaced lifters of each preferred embodiment have ends that project outwardly through a system housing that defines the treatment zones. Extendable and retractable cylinders respectively connected to the outwardly projecting ends of the control members constitute the actuators that pivot the control members to operate the lifters.

A plurality of cooking treatment zones are incorporated in the preferred embodiments. Each cooking zone includes an associated gas circular at its upper extremity. The gas circulator can be located immediately above its associated cooking treatment zone due to the manner in which the laterally spaced lifters of the lifting mechanism are interconnected by the torsionally loaded control members. Consequently, the total height of the system is minimized to facilitate its installation within pre-existing buildings.

The reciprocating beams of the conveyors preferably are supported by rollers and move through openings in the system housing adjacent the junctures between the treatment zones. These openings between the cooking treatment zones are communicated with an exhaust suction of the associated gas circular to prevent the passage of gas from one treatment zone to the next. A framework of the housing includes hollow members that define the beam openings and also slidably support a movable door between the openings. The interiors of the hollow members provide the communication between the beam openings and the exhaust suction of the gas circulator.

The entry end of the meat processing system preferably includes a load station that facilitates loading of the products on the vertically spaced conveyors. This load station includes a stationary framework that supports a vertically movable framework. Movement of the movable framework to a lower position allows the uppermost conveyor to be initially loaded with a middle conveyor and a lower one being subsequently loaded at successively higher positions. The movable framework aligns the products with the conveyors in its highest position and also includes lifters for suspending the loaded products and lowering these products onto the reciprocating beams when the beams are located in their rearwardly reciprocated positions. The products being processed move through a seal chamber prior to entering the first cooking treatment zone. Natural or liquid smoke may be utilized in this seal chamber if desired prior to conveyance of the products through the cooking treatment zones. Following the cooking treatment zones, the system includes an air cool or tap water shower treatment zone and a following blast chill or shower brine chill treatment zone. The exit end of the system includes an unload station with a stationary framework and a vertically movable framework similar to the one of the load station. Either the load station, the unload station, or both may transfer the products from the floor level on which the rest of the system is located to a different floor.

The objects, features and advantages of the present invention are readily apparent from the following detailed description of the preferred embodiments and the drawings.

BRIEF DESCRIPTION OF THE DRAWINGS

FIG. 9 is a cross-sectional view of the system taken along line 9—9 of FIG. 1 and illustrates a movable door which is located between adjacent treatment zones of the system;

FIG. 10 is a side elevation view shown partially in section of a gas circulator used to supply processing gas to a cooking treatment zone of the system FIG. 11 is a partially sectioned view taken along line 11—11 of FIG. 10 and illustrates alternate paths along which the processing gas may be supplied to the associated treatment zone;

FIG. 12 is a view partially in section taken along line 12—12 of FIG. 10 and illustrates the manner in which the processing gas is returned from the cooking treatment zone for recirculation;

FIG. 16 is a side elevation view taken partially in section along line 16—16 of FIG. 15 to show the lifting mechanism;

FIG. 17 is a sectional view of the lifting mechanism taken along line 17—17 of FIG. 16.

DETAILED DESCRIPTION OF THE PREFERRED EMBODIMENTS

Figure 1:
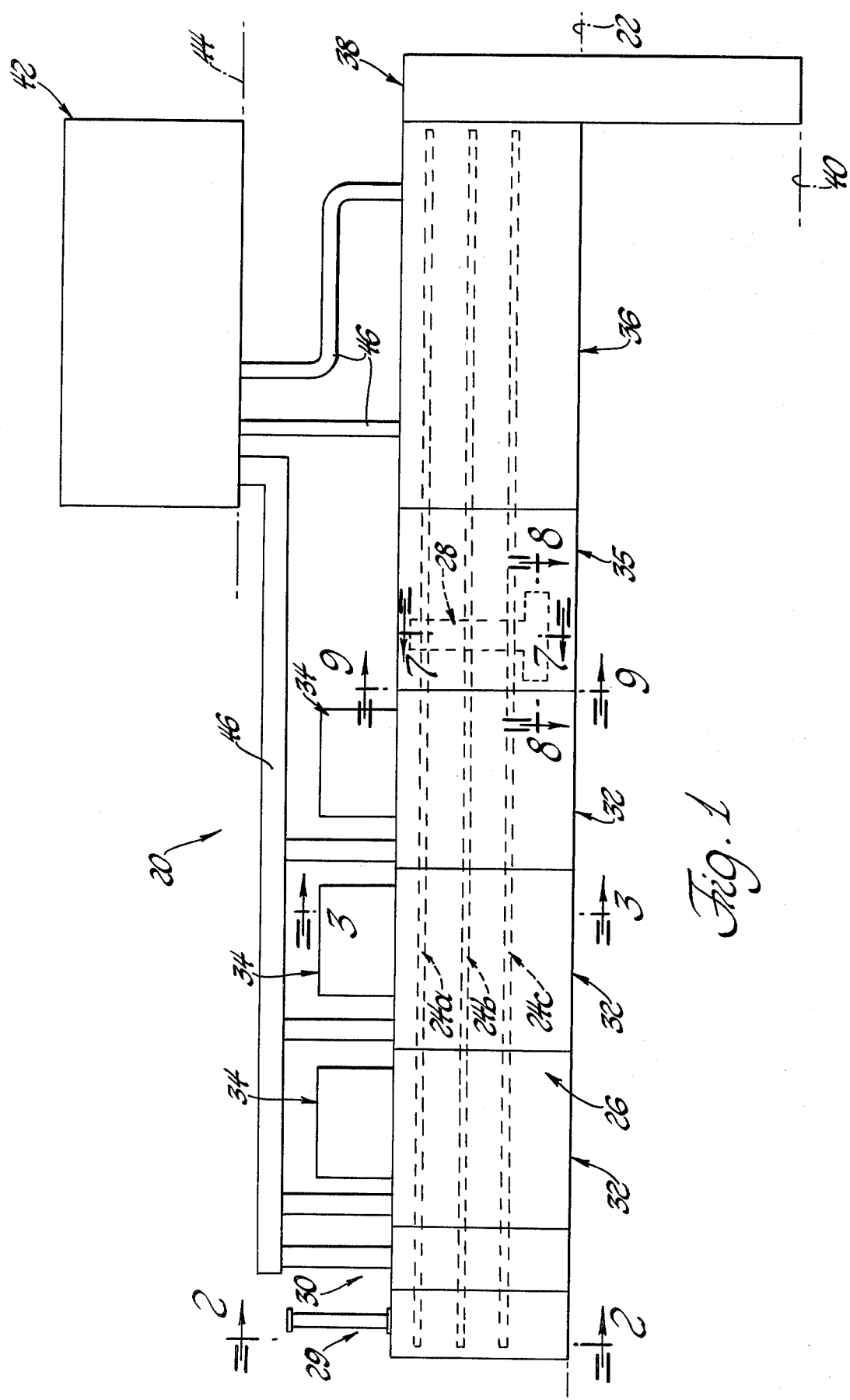
FIG. 1 is a schematic side elevation view of one embodiment of a meat processing system constructed according to the present invention.

The schematic view of FIG. 1 shows one embodiment of an elongated meat processing system collectively indicated by reference numeral 20 and constructed according to the present invention. The meat processing system is supported by a floor 22 shown by phantom lines and includes vertically spaced conveyors 24a, 24b and 24c for conveying the products from the left to the right through an elongated housing 26 that defines various treatment zones of the system. The conveyors are driven by a schematically indicated drive mechanism 28 whose structure will be hereinafter described. A load station 29 adjacent the left-hand end of the system loads the products to be processed onto the conveyors for conveyance toward the right. The products first pass through a seal chamber 30 which has movable doors for preventing the escape of processing gases of the system as will be hereinafter described. The products may be subjected to a liquid or a natural smoke within the seal chamber if necessary. The conveyors advance the products from the seal chamber 30 through three cooking treatment zones 32 which include respective gas circulators 34 that supply hot cooking gases to the products. The products are then conveyed through a treatment zone 35 where an air cool or tap water shower cleanses the products. Subsequently, the conveyance of the products toward the right carries them through a blast or shower brine chill treatment zone 36. After the processing is completed, the products are conveyed to an unload station 38 which moves the products downwardly toward a lower floor 40 for packaging and shipment. It should be noted that the load and unload stations are similar in structure and that the load station 29 can also be adapted to load the products from a different floor than the rest of the system, i.e., from the lower floor 40. Also, a gas processor 42 located on an upper floor 44 receives the processing gases from the system through exhaust ducts 46 and cleans them for return to the environment.

Figure 3:
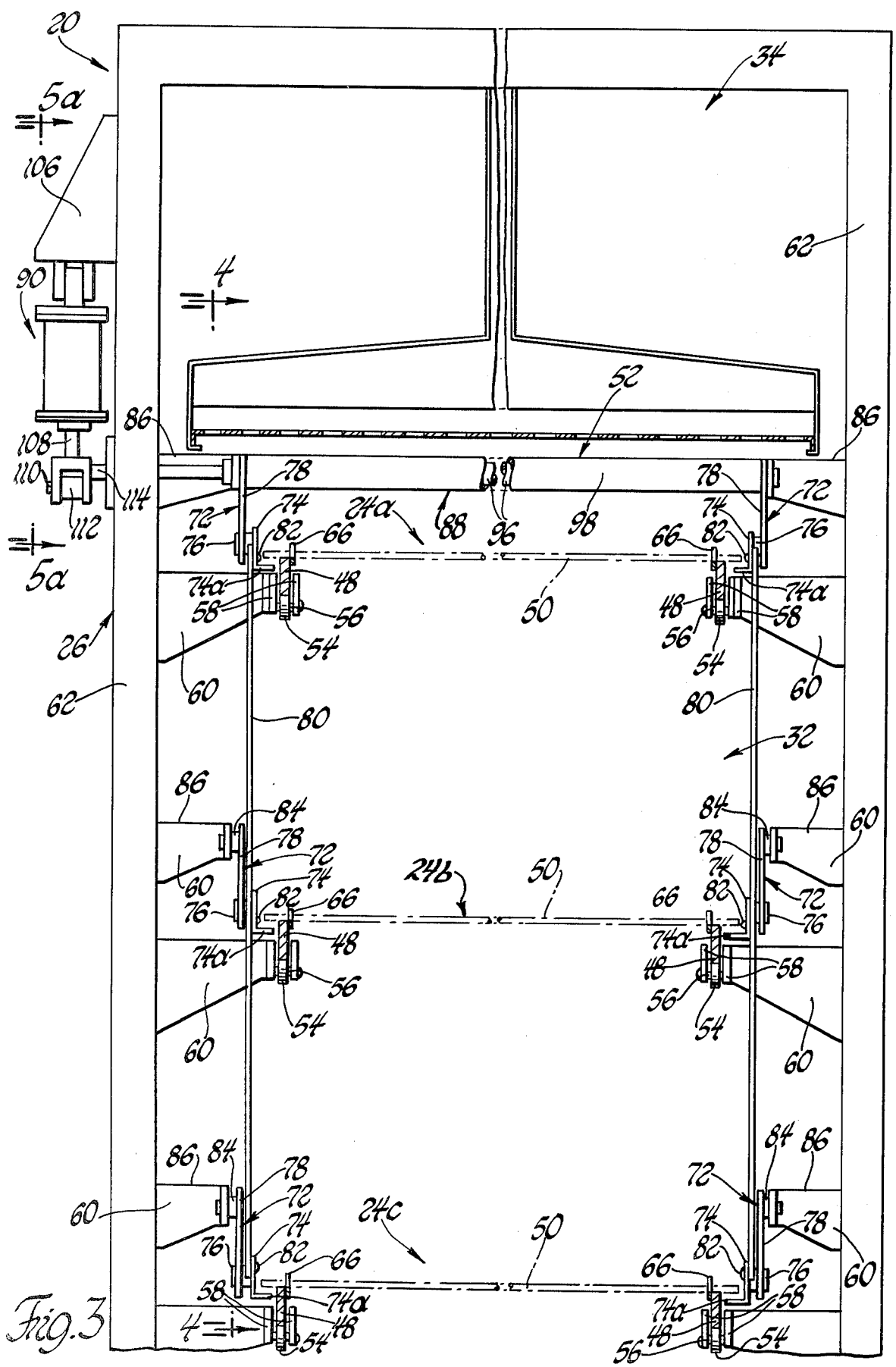
FIG. 3 is a cross-sectional view of the system taken along line 3—3 of FIG. 1 and illustrates a cooking treatment zone.

With reference to FIG. 3, the conveyors 24a, 24b and 24c each include a pair of laterally spaced reciprocating beams 48 extending along the length of the processing system. Product sticks 50 extend laterally between these beams so that the products being processed may be hung on the sticks and thereby supported by the conveyors for treatment within the different treatment zones. A lifting mechanism 52 is utilized to lift the product sticks 50 upwardly from the conveyor beams 48 after a forward beam reciprocation so as to then suspend the products within the adjacent treatment zone. The beams 48 are then reciprocated in a rearward direction before the product sticks 50 are lowered back onto the beams by the lifting mechanism. Subsequently, a forward reciprocation of the beams 48 advances the products forwardly another step along the system.

Figure 4:
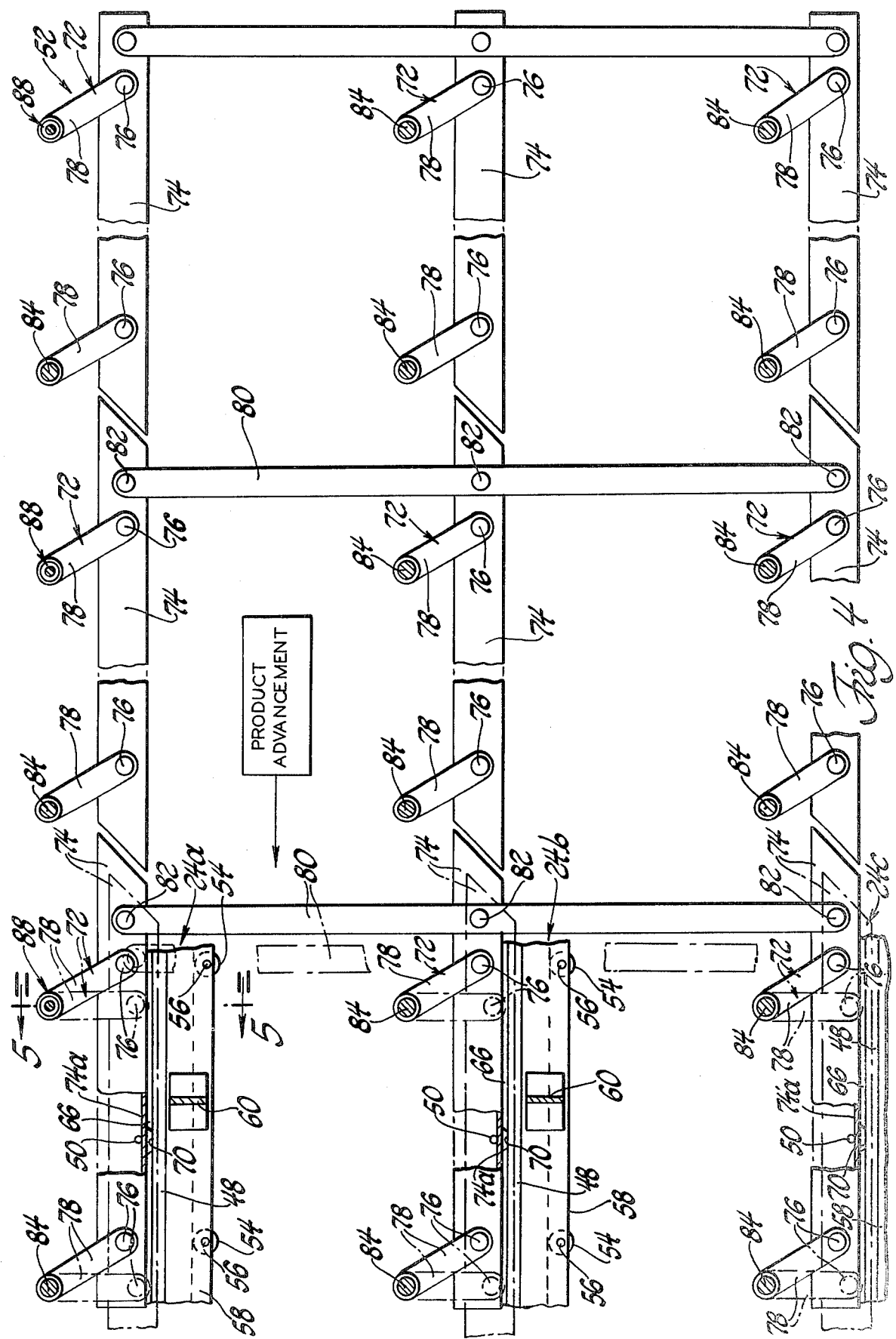
FIG. 4 is a partially broken away side elevation view taken along line 4—4 of FIG. 3 and illustrates conveyors and an improved lifting mechanism that cooperate to advance products being processed along the system.
Figure 5:
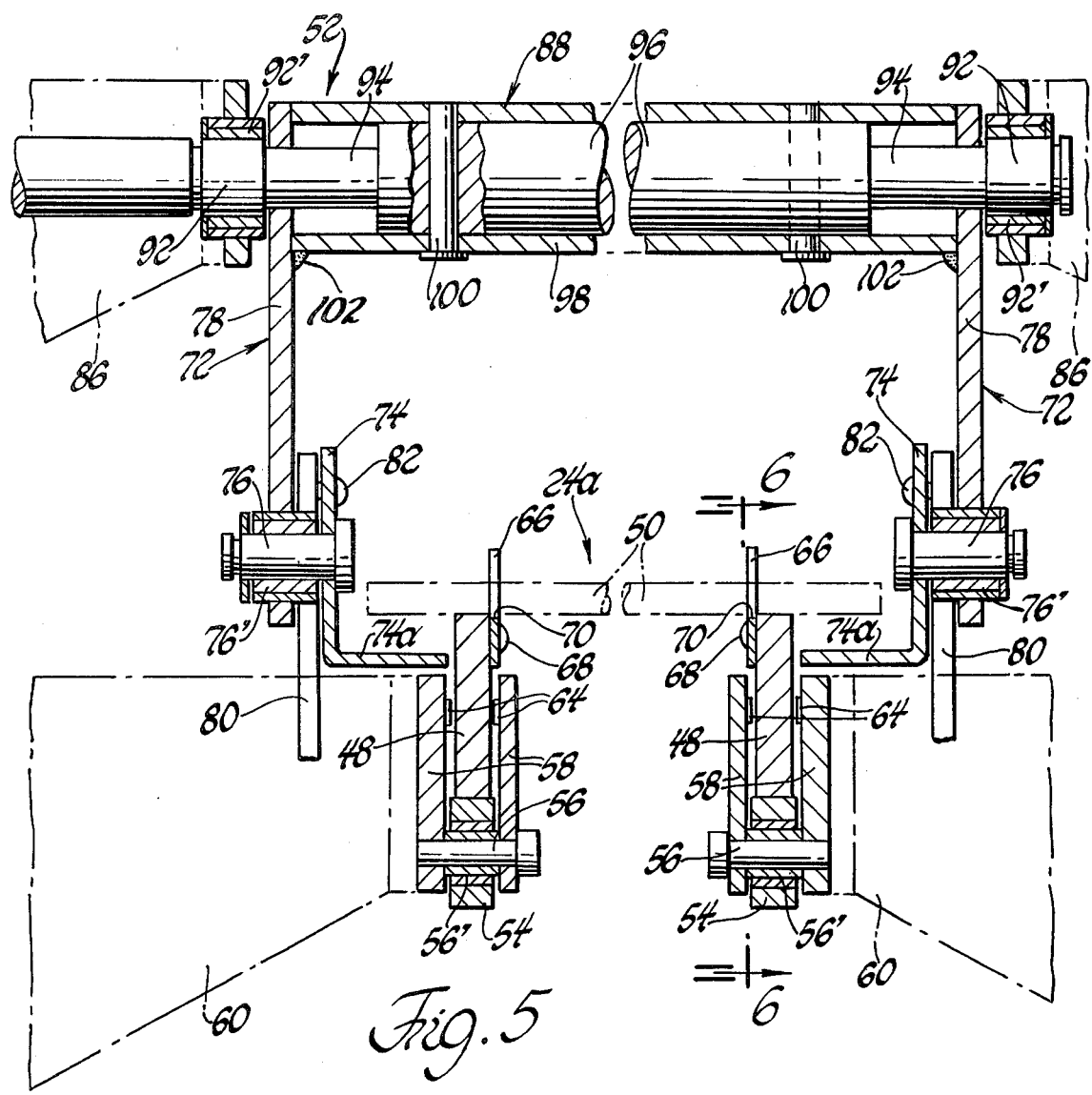
FIG. 5 is an enlarged sectional view taken along line 5—5 of FIG. 4 and illustrates the uppermost conveyor and its associated portion of the lifting mechanism.
Figure 6:
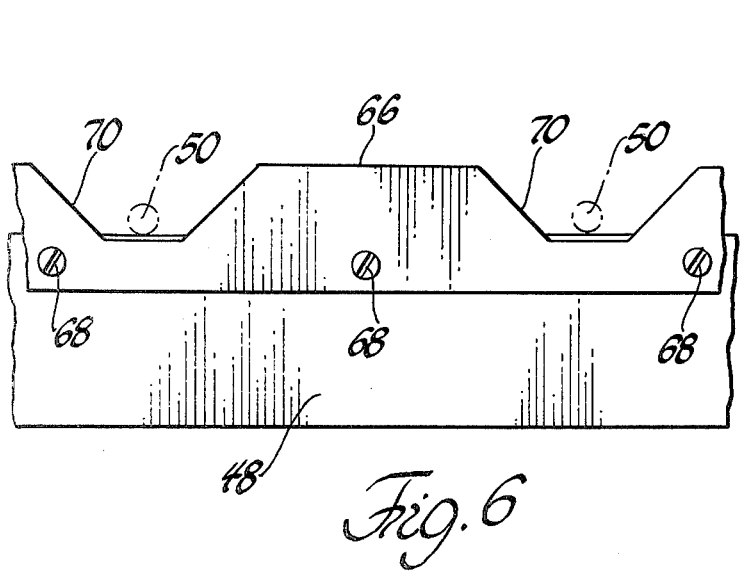
FIG. 6 is a side elevation view taken along line 6—6 of FIG. 5 and illustrates a reciprocating conveyor beam that is used to carry product sticks on which the products being processed are hung.

As seen by combined reference to FIGS. 3, 4 and 5, each reciprocating beam 48 is slidably supported by a plurality of rollers 54 for movement along the length of the system. The rollers are supported by pins 56 that extend between spaced inboard and outboard side plates 58. The outboard side plates 58 are supported by suitable brackets 60 on adjacent housing side walls 62 at a plurality of spaced locations along the length of the system. The opposed faces of the side plates 58 support suitable slides 64, FIG. 5, that slidably engage the lateral sides of the reciprocating beams in a guiding fashion. The inboard sides of the reciprocating beams 48 support positioning members 66 at their upper sides, as best seen in FIGS. 5 and 6. These positioning members are detachably secured to the beams by screws 68 and define upwardly facing openings 70, FIG. 6, in which the ends of the product sticks 50 are received. These positioning members thus position the product sticks along the length of the beams 48 as required. Different positioning members with openings 70 spaced at varying lengths can be utilized as may be necessary by the products being processed due to the detachable securement of the positioning members via the screws 68.

With combined reference to FIGS. 3, 4 and 5, the lifting mechanism 52 includes laterally spaced lifters having parallelogram linkages 72 positioned on opposite sides of the conveyor extending along the length of the system. Each of these linkages includes a horizontal lower link 74 that functions as a lifting arm and has an inwardly extending lifting flange 74a, FIG. 5, for lifting the adjacent ends of the product sticks 50. The opposite ends of the lower links 74 are secured by pins 76, FIG. 4, to the lower ends of a pair of vertical links 78. Vertically extending control links 80 are also connected with the horizontal lower links 74 by pins 82 to interconnect the linkage action of the vertically aligned linkages. As seen by combined reference to FIGS. 3 and 4, the upper ends of the vertical links 78 for each of the two lower conveyors 24b and 24c are supported by pins 84 carried by brackets 86, FIG. 3, that extend inwardly from the housing side walls 62. The FIG. 4 left-hand end of each linkage 72 of the upper conveyor 24a also has the upper end of its adjacent link 78 pivotally supported in a similar manner by pin 84 and an associated side wall mounted bracket 86. The FIG. 4 right-hand links 78 of these upper linkages have their upper ends rotatably supported by similar brackets 86, FIG. 3, and an associated elongated control member or rod 88 that extends laterally through the treatment zone to rotatably interconnect these links as also seen in FIG. 5. The FIG. 5 right-hand end of each control rod 88 terminates adjacent its associated bracket 86 but the left-hand end thereof extends outwardly through the adjacent housing side wall for securement to an associated actuator generally indicated by 90, FIGS. 3 and 5a. Each set of linkages along the length of the system is controlled by such an actuator, as will be described.

As seen in FIG. 5, the rollers 54 for reciprocating beams 48 are supported on their associated pins 56 by pin bushings 56'. Likewise, the lower ends of vertical links 78 are supported on the pins 76 by bushings 76' to provide the rotatable interconnection of the horizontal lower links 74 with the vertical links. The control rod 88 also includes journal portions 92 that are pivotally supported on their associated side wall brackets 86 by bushings 92' such that the control is pivotal about its elongated direction. Although it is not shown in the drawings, the pins 82 and 84 shown in FIG. 4 are also provided with similar bushings to pivotally interconnect their associated linkage components in the same manner as the bushings shown in FIG. 5. Laterally inboard from the journal portions 92, the control rod 88 includes reduced diameter portions 94, FIG. 5, that pass through suitable openings in the upper ends of vertical links 78. The control rod 88 also includes a central enlarged diameter portion 96. Control rod portion 96 is received within a torque tube 98 to which it is rotatably fixed by suitable press fitted pins 100. The opposite ends of the torque tube 98 are suitably secured such as by welds 102 to the upper ends of the adjacent vertical links 78 which function as crank arms so that the control rod 88 interconnects the linkage movement at opposite lateral sides of the treatment zones.

Figure 5A:
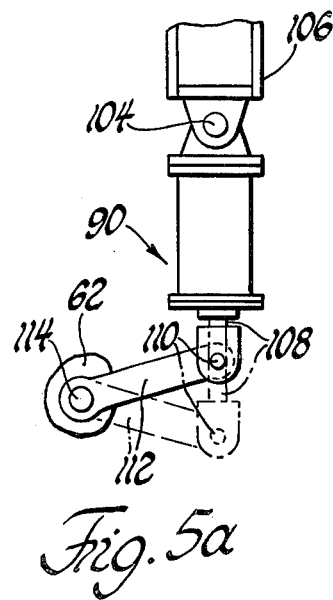
FIG. 5a is a side elevation view taken along line 5a—5a of FIG. 3 and illustrates an actuator for the lifting mechanism.

With reference to FIG. 5a, the linkage actuator 90 comprises an air cylinder with one end secured by a pin 104 to a bracket 106 on the outside of the housing side wall. A piston connecting rod 108 of the cylinder is pivotally secured by a pin 110 to one end of a crank arm or link 112. The other end of link 112 is fixedly secured in any suitable manner to a control rod end portion 114 that extends outwardly through the adjacent housing side wall 62. Retraction and extension of the cylinder actuator 90 pivots the link 112 between its solid line and phantom line indicated positions shown in FIG. 5a so that the control rod 88 within the adjacent treatment zone moves its associated linkages angularly as shown by the left-hand linkages in FIG. 4 between solid line and phantom line indicated positions. The horizontal lower links 74 are moved vertically by the angular linkage movement such that their lifting flanges 74a lift the ends of the product sticks 50 upwardly from beams 48 when the linkages move to the solid line position and return the sticks to the beams when the linkages move to the phantom line position. Consequently, the products hung on the sticks are suspended withing the associated treatment zone for processing by the lifting mechanism and the control rod 88 in then loaded in a torsional mode. As previously stated, the lifting action takes place after a forward reciprocation of the beams 48 is completed and the sticks remain suspended while the beams 48 are reciprocated rearwardly. Prior to a subsequent forward reciprocation of the beams 48, the linkages 72 are moved angularly back to the phantom line indicated position of FIG. 4 by the actuator 90 shown in FIG. 5a to return the product sticks 50 to the beams for another step forward within the associated treatment zone.

In the preceding paragraph, the lifting mechanism with its laterally spaced lifters incorporating the linkages 72 shown in FIG. 4 was described in a steady state manner with a single product moving through the associated treatment zone. However, as previously stated, the conveyance of slower moving products for processing may commence prior to the completion of processing of faster moving products. This is accomplished by maintaining the trailing, slower moving products suspended by their associated linkages 72 during one or more reciprocations of the beams 48 while the faster moving products are lifted and returned to the beams by their associated linkages 72 during each forward and rearward reciprocation. The slash end configurations of the horizontal lower links 74, as shown in FIG. 4, permit this selective linkage actuation to take place without interference of the adjacent ends of the links. In this connection, it should be noted that each of the linkages 72 has a total length of approximately four feet, this being the same distance the beams 48 are reciprocated during each forward and rearward stroke. Also, the load station 29 and seal chamber 30 shown in FIG. 1 each have a length that corresponds to one storke of the reciprocating beams while each of the cooking treatment zones 32 has a length that corresponds to three strokes of the reciprocating beams, approximately 12 feet. The air cool or tap water shower treatment zone 35 likewise has a length that corresponds to three strokes of the reciprocating beams while the blast or shower brine chill treatment zone 36 has a total length that corresponds to six strokes of the reciprocating beams. The unload station 38, like the load station, has a length that corresponds to a single stroke of the beams. The lifting mechanism 52 includes parallelogram linkages 72 at each of these stations or treatment zones with the number of these linkages along the length thereof being in a one-to-one relationship to the length in reciprocating strokes.

Figure 7:
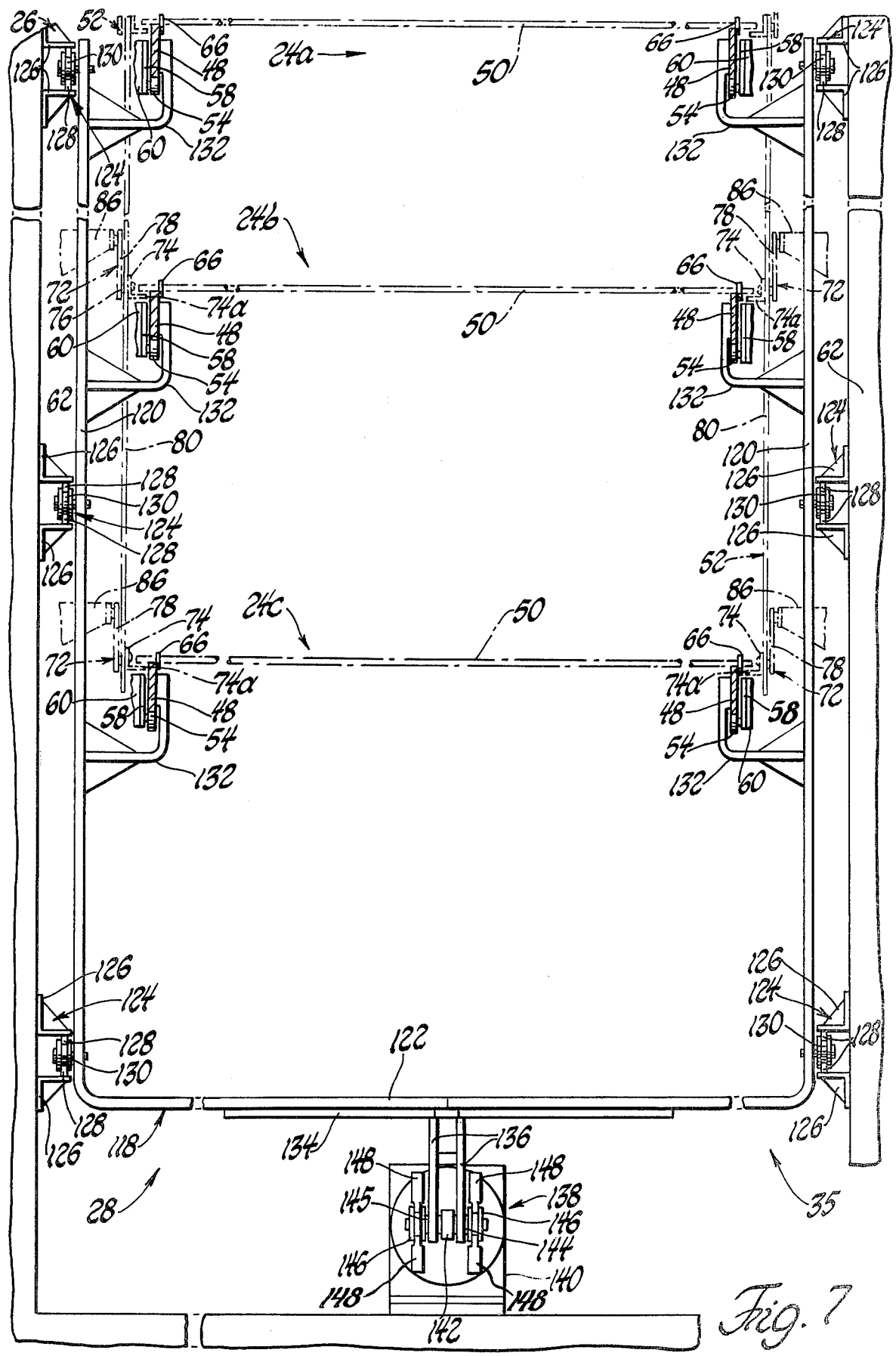
FIG. 7 is a cross-sectional view of the system taken along line 7—7 of FIG. 1 and illustrates a drive mechanism for the vertically spaced conveyors of the system.

With reference to FIG. 7, the reciprocating beams 48 of the vertically spaced conveyors 24a, 24b and 24c are driven by the drive mechanism 28 which is located within the air cool or tap water shower treatment zone 35. This drive mechanism includes a drive member 118 that has a U-shaped configuration oriented in an upwardly opening direction. The configuration of the drive member is defined by a pair of vertical legs 120 whose lower ends are interconnected by a horizontal base 122. The vertical legs 120 are slidably mounted by slide assemblies 124 on the adjacent housing side walls 62, see also FIG. 8. These slide assemblies include side wall mounted brackets 126 that support longitudinally extending bars 128. The longitudinally extending bars 128 cooperate in pairs as shown in FIG. 7 to receive slides 130 on the outboard sides of the vertical legs 120 of the drive member. Drive member 118 is thus supported for reciprocal movement between the solid and phantom line indicated positions of FIG. 8 by the slide assemblies 124. Brackets 132 on the vertical legs 120 of the drive member extend inwardly therefrom and then upwardly in a right angle manner for connection to the inboard sides of the adjacent conveyor beams 48 in any suitable manner. These brackets 132 thus reciprocate the conveyor beams along with the drive member. The conveyor beams are supported on their lower sides by the rollers 54 previously described and at their outboard sides by the outboard side plates 58. However, at this location, the inboard side plates 58 previously described in connection with FIG. 5 are eliminated to permit connection of the drive member brackets 132.

Figure 8:
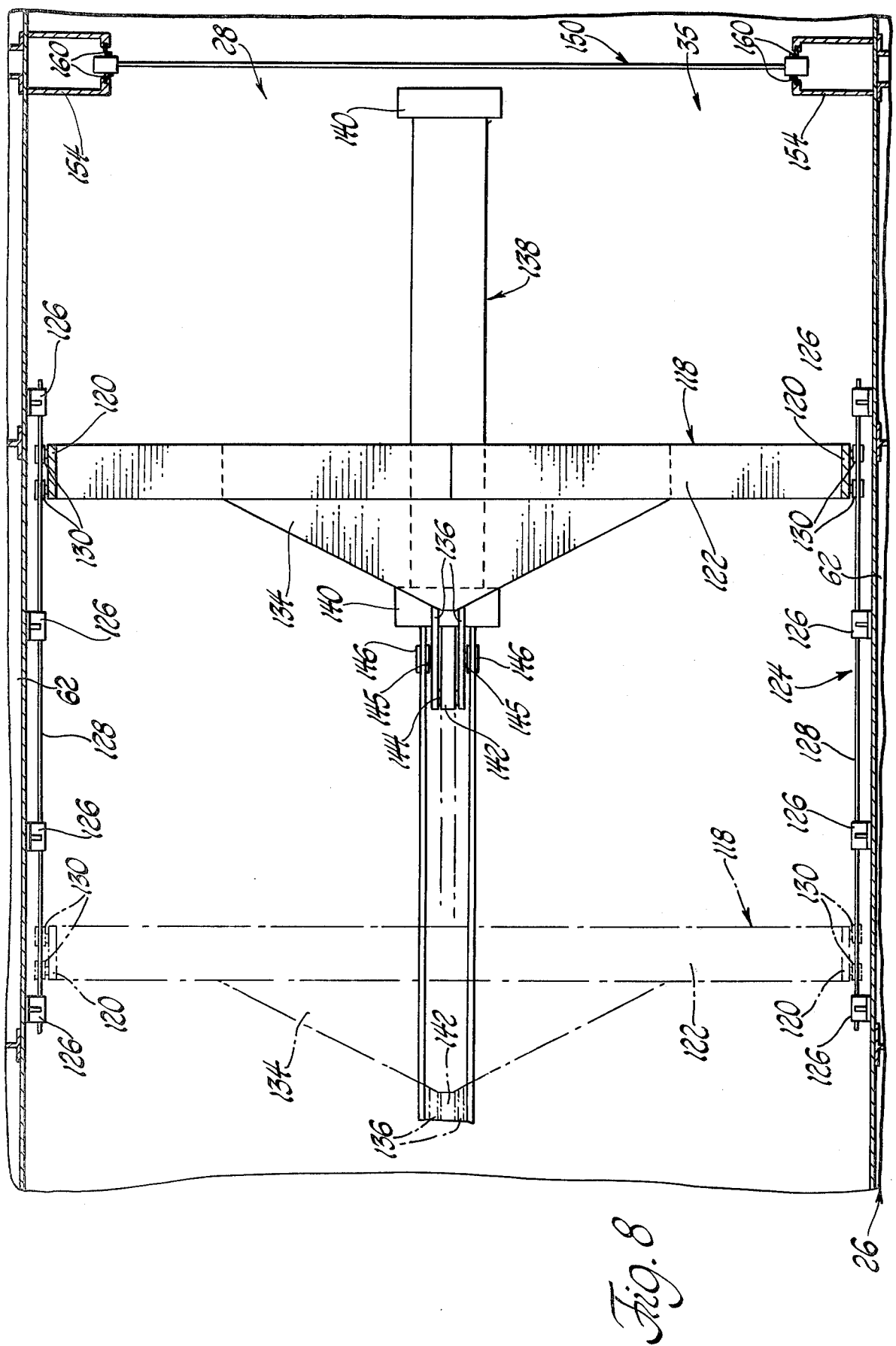
FIG. 8 is a plan view taken in section along line 8—8 of FIG. 1 and also illustrates the conveyor drive mechanism.

As shown in FIG. 7, the lower side of the drive member base 122 includes a plate 134 fixedly secured thereto in a suitable manner. This plate includes a pair of downwardly extending spaced legs 136 which function to interconnect the drive member with a drive cylinder 138 that provides a reciprocating drive means for the conveyors. The drive cylinder is positioned on the floor of the treatment zone 35 by brackets 140 and has a piston connecting rod 142 that extends outwardly to be received between the downwardly extending vertical legs 136 on the drive member plate 134, see FIG. 8 also. A pin 144 interconnects the piston connecting rod 142 and the spaced legs 136. A pair of pins 145 are respectively mounted on the outboard sides of the legs 136 and support a pair of slides 146 that are received between elongated bars 148 extending along the length of the system in associated pairs. These bars 148 have first ends secured to the bracket 140 at one end of drive cylinder 138 and have their opposite ends suitably secured by an unshown bracket. As seen in FIG. 7, the slides 146 are positioned between the associated pairs of elongated bars 148 to cooperate in guiding the piston connecting rod 142 between retracted and extended positions. Pressurized air is supplied to cylinder 138 to move a piston connected to the inner end of rod 142 so that the rod moves between retracted and extended positions relative to the cylinder, as shown by FIG. 8, to reciprocate the drive member 118 and the conveyor beams 48. The retracting cylinder action moves the drive member to the right as in FIG. 8 (from the phantom line position to the solid line position) in a forward direction. This movement pulls the conveyor beams to reciprocate them forwardly and thereby advances the products carried by the beams. The extending cylinder action moves the drive member in the opposite direction to reciprocate the beams rearwardly in a pushing manner.

With reference to FIGS. 1 and 9, a movable door 150 is located between the last cooking treatment zone 32 and the air cool or tap water shower treatment zone 35. The meat processing system 20 also includes similar doors between the load station 29 and the seal chamber 30, between the seal chamber 30 and the first cooking treatment zone 32, between the first and second and the second and third cooking treatment zones 32, between treatment zones 35 and 36, and between treatment zone 36 and unload station 38. The description of the movable door 150 in reference to FIG. 9 will thus be applicable to each of these other doors as well.

As shown in FIG. 9, the system housing 26 includes a stationary framework 152 that slidably supports the door 150 for vertical movement between an upper open position as shown in FIG. 9, and a lower closed position where it closes the area between the two adjacent treatment zones. The stationary framework 152 includes a pair of hollow vertical members 154 whose upper ends are interconnected by a hollow upper member 156. The vertical members 154 angle slightly outwardly adjacent a horizontal support member 158 and include seals 160, see also FIG. 8, that slidably engage the door edges to provide a generally sealed condition with the door in its lower closed position. These seals 160 also engage each other above the door when the door is in its lower closed position so the interior of the hollow members 154 are not open to the environment. A screw-eye 162 is secured to the upper edge of door 150 and attaches a cable 164 that extends over a pair of pulleys 166 that are supported by a horizontal arm 168 extending laterally from the upper member 156 of the framework. The cable 164 extends downwardly from the outboard pulley 166, around a third pulley 170 and then upwardly for securement to the arm 168 by an attachment fitting 172. The third pulley 170 is rotatably supported by the outer end of a piston connecting rod 174 associated with an air cylinder actuator 176. The lower end of this actuator is secured by a bracket 178 to the adjacent lateral side of the system housing 26. Pressurized air is supplied to this cylinder actuator 176 to retract the piston connecting rod 174 in a manner that raises the door 150. During this door opening, the stroke of the piston connecting rod 174 is only half the distance of the door movement due to the cable and pulley arrangement shown. Pressurized air is also supplied to the cylinder actuator 176 in the opposite direction to extend the rod 174 so door 150 is lowered to close the area between the two adjacent treatment zones of the system. The doors of the system are opened during forward reciprocation of the beams 48 as they carry the products for advancement through the system but are closed the rest of the time to prevent processing gases and the like from flowing between the different treatment zones.

As shown in FIG. 9, the reciprocating beams 48 of the uppermost conveyor 24a extend through openings 180 in the vertical members 154 of the stationary framework 152 at opposite lateral sides of the adjacent door 150. Identical openings are also provided for the two lower conveyors 24b and 24c so as to receive their associated reciprocating beams. The openings 180 in addition to having a vertical portion through which the beams move have a horizontal portion through which the ends of the product sticks 50 pass during forward reciprocation of the beams while the door is raised in its open position. These openings 180 are also preferably communicated by the hollow vertical members 154 with an exhaust suction so that any gases passing through the openings are sucked upwardly to an exhaust in a manner that will be more fully hereinafter described.

Referring to FIG. 10, each gas circulator 34 is located immediately over its associated cooking treatment zone 32. This is possible since the cooking treatment zones have their upper extremities unobstructed due to the manner in which the laterally spaced lifters of the lift mechanism 52 have their linkages 72 operated from the lateral side of the system in the manner previously described. This placement of the gas circulator immediately over the upper side of the cooking treatment zone minimizes the total height of the system and thereby facilitates its installation in pre-existing buildings.

Each gas circulator 34 includes a gas blower 182 enclosed within a sheet metal housing 184 that is mounted on the upper side of the system housing 26. Steam heater coils 186 are located between the blower 182 and the right-hand end of the housing 184. A damper 188 allows a certain amount of environmental air to enter the housing 184 through an entry duct 190 located at the upper side of the circulator housing. This environmental air is combined with return gases R that flow upwardly from the associated cooking treatment zone through a return duct 192. After being combined and heated by coils 186, the environmental air and the return gases cooperatively provide a heated processing gas that the blower 182 directs downwardly through a supply duct 194 located at the central portion of the upper side of the treatment zone. This supply duct 194 directs the processing gas downwardly toward a damper 196 which is carried by a support rod 198 for movement between the solid and phantom line indicated positions shown by FIG. 11. The opposite ends of the support rod 198 are mounted by journals 200, FIG. 10, and its right-hand end is connected to a suitable actuator 202 that moves the damper between its two positions shown in FIG. 11. When the damper 198 is located in its solid line position of FIG. 11, the processing gases flow downwardly through the supply duct 194 and then to the right along the path shown by the right-hand arrow S. The supply duct 194 includes duct portions 204 that extend longitudinally at each lateral side of the system so that the supply gas can be introduced into the treatment zone along its total length when the damper directs the gas toward the associated lateral side. The processing gas flows downwardly from each supply duct portion 204 through openings 206 between vertical sheet metal supports 208, FIG. 10. Oscillating movement of the damper 196 between its two positions shown in FIG. 11 thus causes the supply gas to be alternately introduced into the associated cooking treatment zones at opposite lateral sides so as to provide a turbulent flow of the gases which causes complete cooking of the products being processed.

A return plenum 210 of the gas circulator 34 is located above the associated cooking treatment zone and includes a ceiling plate 212 that is apertured so as to permit the processing gases to pass upwardly into the plenum. The previously mentioned sheet metal supports 208 extend between the lateral sides of the return plenum 210 and the system housing side walls 62 to provide support for this plenum. The return plenum 210 extends along the total length of the associated cooking treatment zone so as to collect the processing gas after it has been used to cook the products and then directs most of these gases back through the return duct 192 for reuse. As shown in FIG. 10, a portion of the processing gases from the plenum are exhausted as shown at arrow E through the exhaust duct 46 by a suction fan 214. The amount of this exhausted gas would normally represent about 10% to 15% of the total volume of gas present within the gas circulator 34.

As shown in FIG. 10, the exhaust duct 46 is also connected by a duct 216 to the hollow upper member 156 of the stationary door framework 152. This communication provides the exhaust suction previously described in connection with FIG. 9 so that the openings 180 through which the reciprocating beams 48 move are communicated with the exhaust to prevent gas flow between the adjacent treatment zones. The seals 160 engage each other above the doors 150 so that members 154 provide a closed conduit for communicating this exhaust suction to the housing openings through which the conveyor beams reciprocate as previously discussed.

Figure 2:
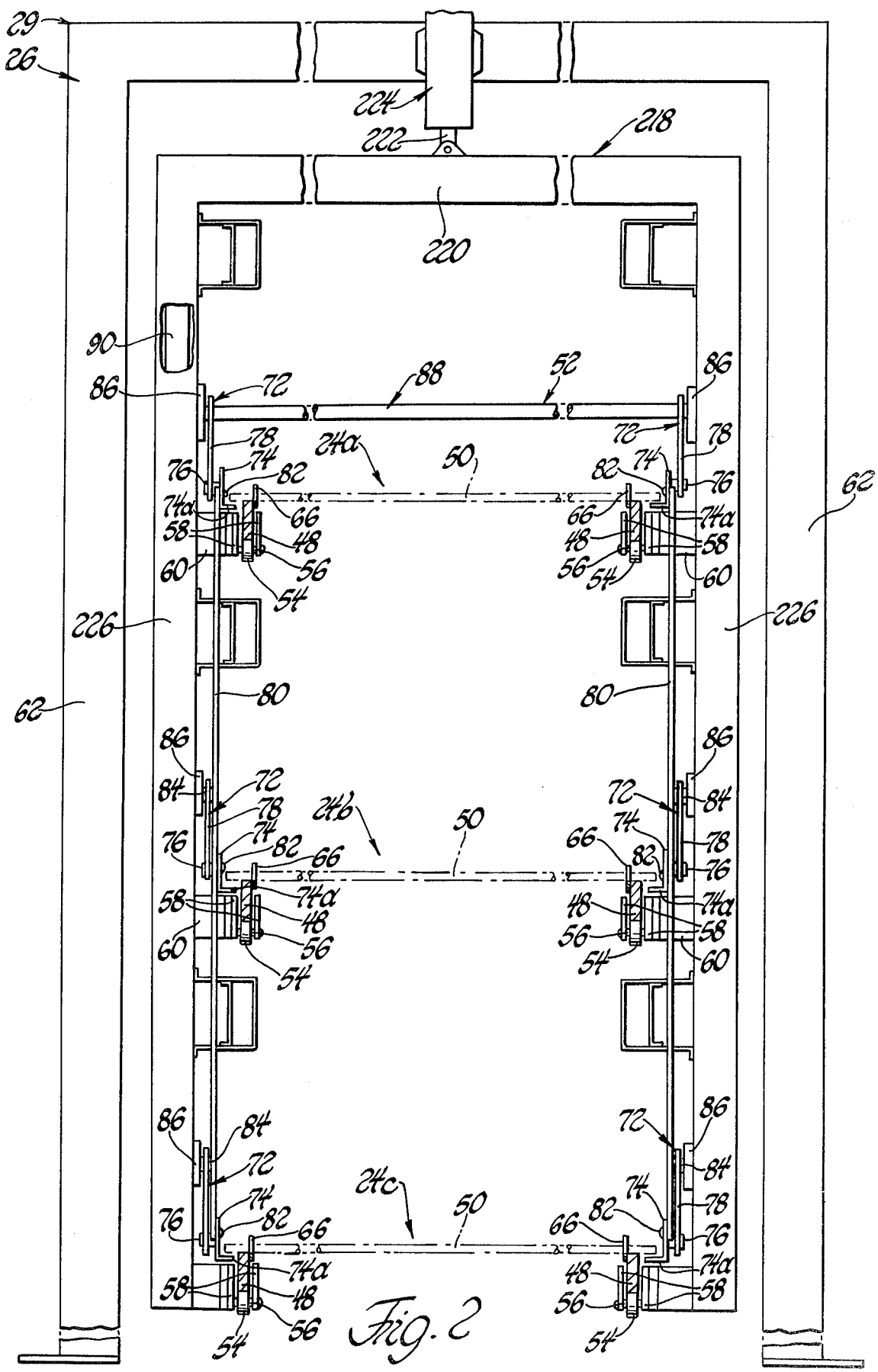
FIG. 2 is a cross-sectional view of the system taken along line 2—2 of FIG. 1 and illustrates a load station.

With reference to FIG. 2, the load station 30 will now be described with the understanding that the unload station 38 has a similar structure except for the fact that it has a greater vertical extent and extends between the floors 22 and 40 as shown in FIG. 1. A vertically movable framework 218 of the load station has a U-shaped configuration that opens downwardly. An upper base 220 of this framework is supported by the piston connecting rod 222 of an actuating cylinder 224 that is mounted on the upper extremity of the system housing 26. This cylinder moves the framework 218 vertically in a manner that will be subsequently described. Downwardly extending vertical legs 226 of the framework 218 depend from each end of the frame base 220 and are associated with opposite lateral sides of the system. These vertical legs 226 support the lifters including the parallelogram linkages 72 of the load station portion of the lifting mechanism 52. The left-hand leg 226 shown also supports the actuator 90 for moving the associated linkages 72 between their raised and lowered positions as previously described in connection with FIG. 4. When the reciprocating beams 48 are located in their forward positions, the cylinder 224 lowers the movable framework 218 so that the product sticks 50 can be conveniently loaded by an operator onto the uppermost linkages with their ends supported by the inwardly extending lifting flanges 74a on the horizontal lower links 74 of these linkages. After loading the uppermost linkage, the cylinder 226 raises the movable framework to permit convenient loading of the intermediate linkages and then subsequently raises the framework to the position shown to permit loading of the lower linkages. The linkages 72 are then positioned in their raised position, as shown by solid lines in FIG. 4, to permit the beams 48 to be reciprocated rearwardly below the loaded product sticks. The control actuator 90 then moves the linkages 72 of the load station to their lower position so that the product sticks 50 are loaded onto the reciprocating beams 48 in readiness for a forward reciprocation. After the forward reciprocation, the movable framework 218 can again be moved downwardly for loading of additional products.

As previously mentioned, the unload station 38 has a construction similar to the load station 30. However, the vertically movable framework of the unload station moves between the floors 22 and 40, FIG. 1, to carry the processed products downwardly for packaging and shipment. The parallelogram linkages of the laterally spaced lifters of the unload station are positioned in their lower position, as in the phantom line position of FIG. 4, prior to a forward reciprocation of the conveyor beams 48 so that the product sticks carried by these beams move over the lifting flanges of the horizontal lower links of the unload station linkages. After forward reciprocation, these parallelogram linkages are moved to their raised position, the solid line position of FIG. 4, to lift the processed products from the conveyor beams. Subsequently, rearward reciprocation of the conveyor beams 48 allows the movable framework of the unload station to be moved downwardly from the upper floor 22 to the lower floor 40 for unloading. The unloading can proceed at different positions so that the product sticks are conveniently accessible to the operator removing the processed products. Thus, the products will be first removed from the lowermost linkage of the unload station and subsequently from the intermediate and upper one at successively lower positions of its movable framework.

Figure 13:
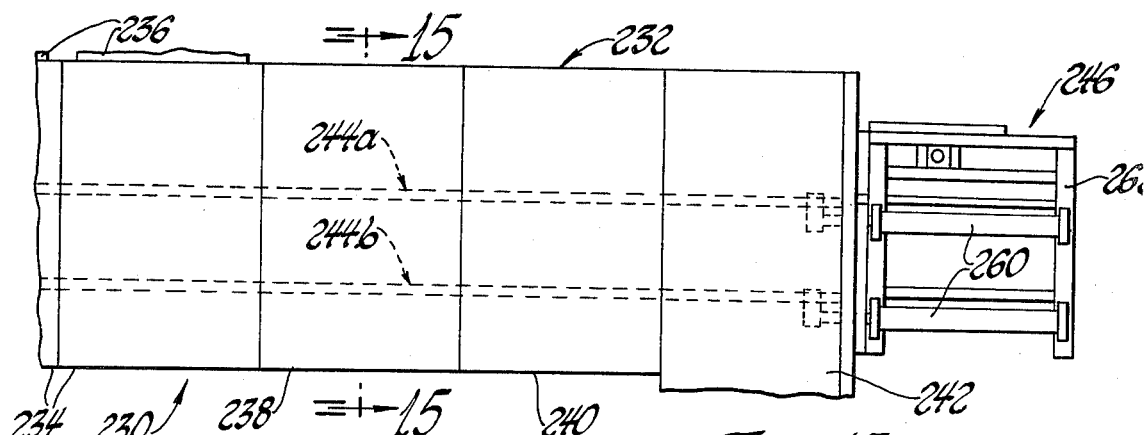
FIG. 13 is a partial schematic side elevation view of another embodiment of a meat processing system constructed according to the present invention.

Referring to the partial schematic view of FIG. 13, another embodiment of a meat processing system constructed according to the present invention is indicated collectively by reference numeral 230. This meat processing system is similar in many respects to the one shown by FIGS. 1-12 and much of the previous description is thus applicable here as well. System 230 includes a housing 232 that defines various treatment zones in the same manner as the other embodiment. A plurality of cooking treatment zones 234 (two shown) are defined by the housing and each includes a gas circulator 236 mounted on the upper side thereof and constructed in the same manner as the previously described gas circulator. Likewise, an air cool or tap water shower treatment zone 238 follows the cooking treatment zones and is itself followed by a blast or shower brind chill treatment zone 240. An unload station 242 follows treatment zone 240 and has a similar construction to the previously described load station of the other embodiment except as will be noted. Preceding the cooking treatment zones 236, the system includes an unshown load station and seal chamber constructed in the same manner as in the previous embodiment except as will be noted and functioning in the same way to provide processing of products by the system. A pair of vertically spaced conveyors 244a and 244b provide conveyance of meat products or the like being processed through the various treatment zones. Although two vertically spaced conveyors are herein disclosed, any other number such as three or more could also be utilized to convey the products being processed. These conveyors are of the forwardly and rearwardly reciprocating type as in the previously described embodiment. A drive mechanism collectively indicated by 246 provides reciprocal movement of the conveyors in a manner subsequently described.

Figure 14:
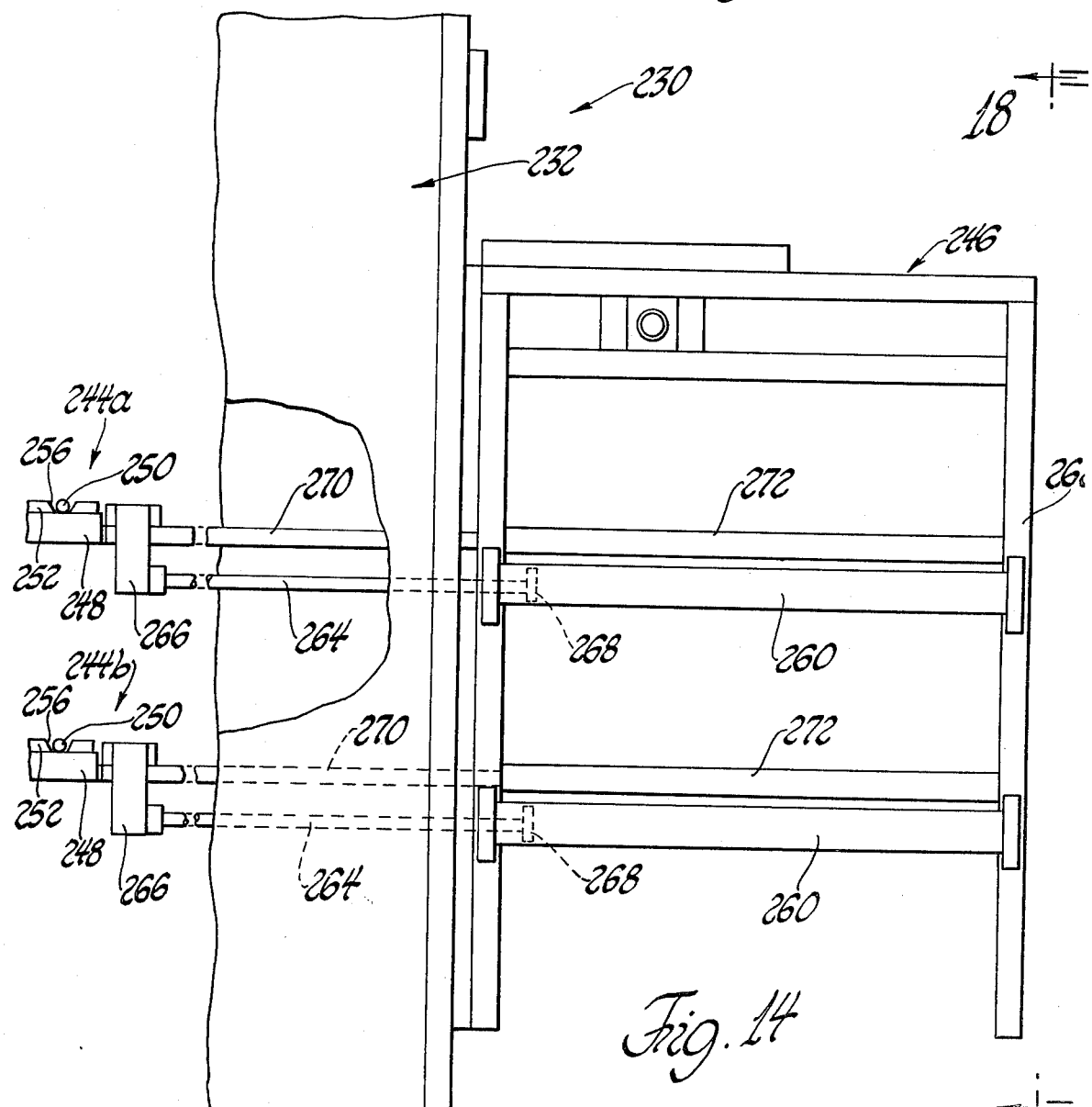
FIG. 14 is a partially broken away enlarged view of a portion of FIG. 13 at the exit end of the system.
Figure 15:
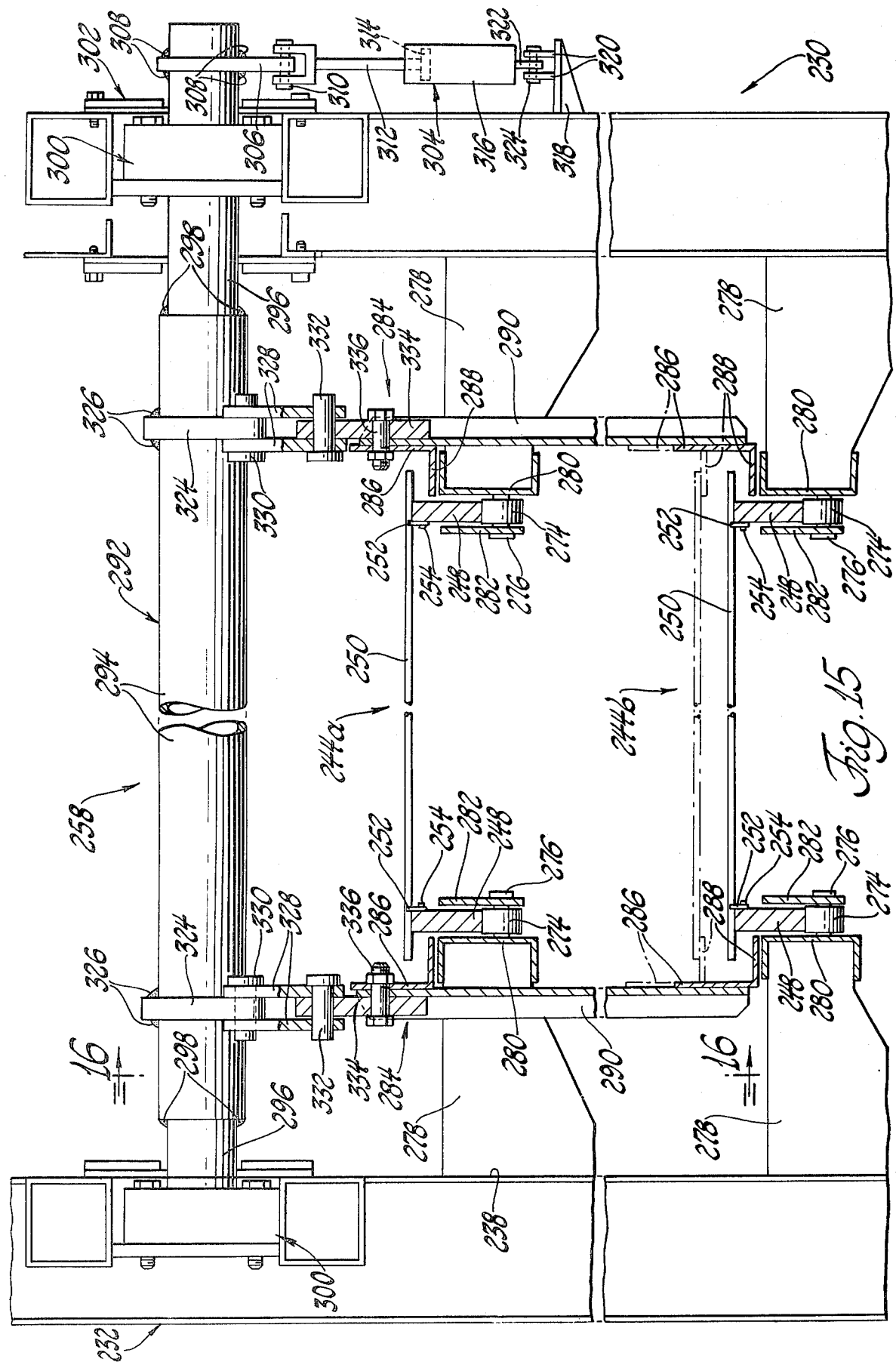
FIG. 15 is a cross-sectional view of the system taken along line 15—15 of FIG. 13 to show conveyors and a lifting mechanism of the system that cooperate to advance products through treatment zones defined by a housing of the system.

With combined reference to FIGS. 14 and 15, each conveyor 244a and 244b includes a pair of laterally spaced beams 248 extending the length of the system. Product sticks 250 have opposite ends supported by these beams and intermediate portions for supporting products to be processed. Detachable positioning members 252 secured to the beams by screws 254 (FIG. 15) include upwardly facing openings 256 (FIG. 14) receiving the ends of the sticks so as to provide stick positioning along the length of the beams. A lifting mechanism 258 shown in FIG. 15 lifts the opposite ends of the product sticks 250 upwardly off the beams 248 after the beams have been reciprocated forwardly, to the right as in FIG. 14, by the drive mechanism 246 and returns the sticks to the beams after rearward reciprocation of the beams by the drive mechanism prior to another forward reciprocation.

Figure 18:
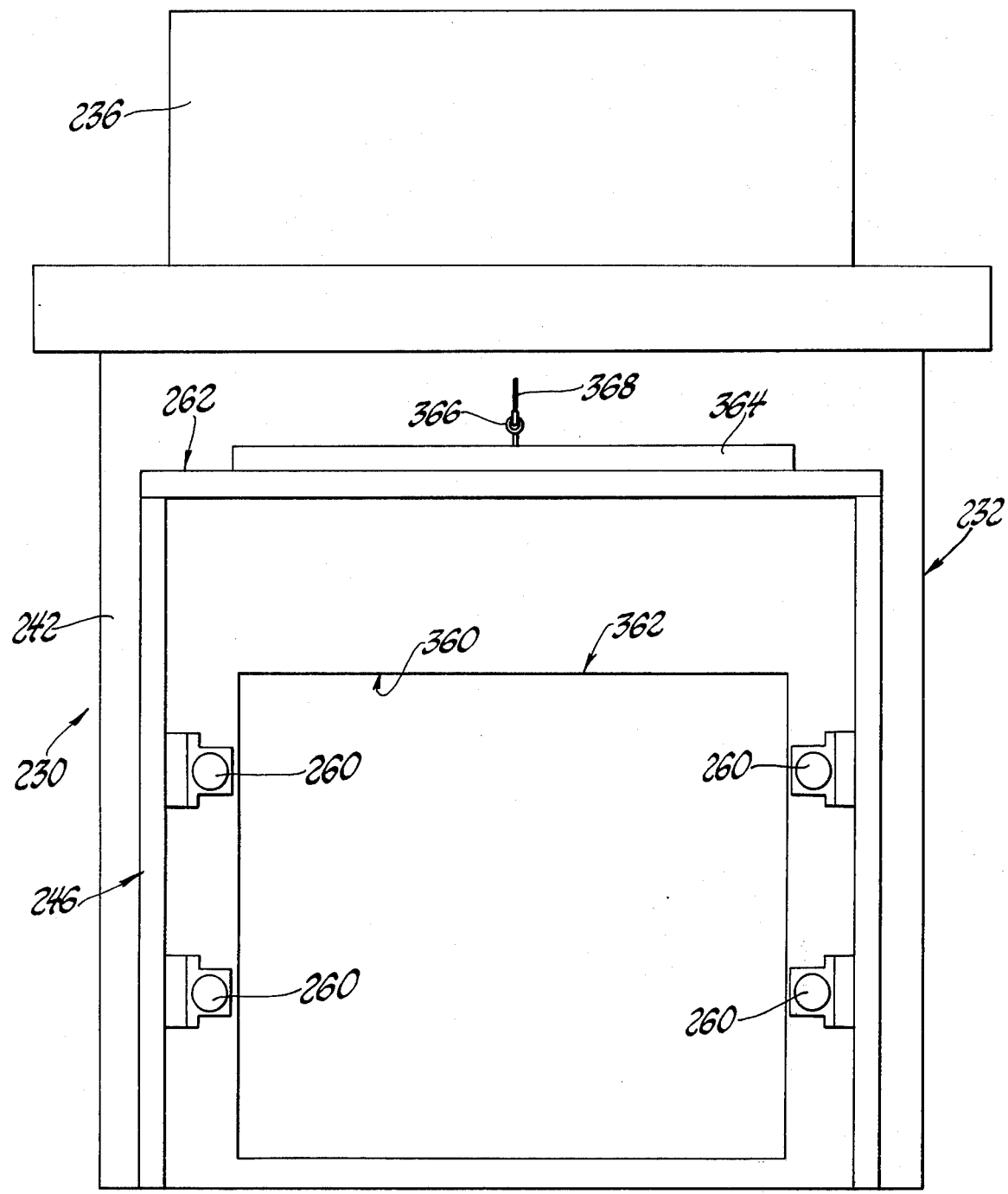
FIG. 18 is an end view of the system taken along line 18—18 of FIG. 14.

As seen by combined reference to FIGS. 14 and 18, drive cylinders 260 are supported by a framework 262 of the drive mechanism 246. Connecting rods 264 of the drive cylinders 260 extend into the system housing 232 through suitable apertures and are connected by couplings 266 to the forward ends of their associated beams 248. Pistons 268 of the drive cylinders are moved to the right and the left by suitable pressurized fluid such as compressed air in order to reciprocate the connecting rods 264 in a manner that causes forward and rearward reciprocation of beams 248. Guide rods 270 secured to the couplings 266 extend outwardly through suitable apertures in the system housing 232 and are received within guide tubes 272 on the framework 262 in a telescoping manner. The guide rods and tubes maintain the reciprocating beams 248 in their proper positions during forward and rearward movement. During such movement, the beams 248 slide along rollers 274 shown in FIG. 15 as being mounted by associated pins 276 on housing side wall brackets 278. Each beam 248 is restrained from lateral movement by an outer channel 280 mounted on the associated bracket 278 and by an inner plate 282 supported by the roller pin 276.

As seen by combined reference to FIGS. 15 and 16, lifting mechanism 258 includes laterally spaced lifters 284 on opposite sides of the conveyors 244a and 244b. Lifters 284 include lifting arms 286 with inwardly extending lifting flanges 288 positioned below the adjacent ends of product sticks 250. Vertically extending support members 290 of lifters 284 are fixedly connected in a suitable manner such as by welding to the mid-sections of the lifting arms 286. These arms have a length equal to the reciprocating stroke length of beams 248. A plurality of the lifters 284 are positioned along the length of the system 230 at each of its sides in lateral alignment with lifters on the other side.

The laterally aligned lifters 284 at each side of the system are interconnected for concurrent operation by a control member 292 seen in FIG. 15 as being elongated in a laterally extending direction. Control member 292 includes an intermediate tubular portion 294 and has opposite ends 296 received within the opposite ends of the tubular portion so as to be secured thereto by welds 298. Housing side wall mounted pillow blocks 300 receive and pivotally support the opposite ends 296 of the elongated control member 292 so that it is pivotal about its elongated length. One of the control member ends 296 extends outwardly through a side wall mounted seal assembly 302 of housing 232 for connection to a pivotal actuator 304. A crank arm 306 of this outwardly projecting control member end 296 is secured by welds 308 and projects radially with respect to the axis of pivotal control member movement. Crank arm 306 is connected by a pin 310 to one clevised end of a connecting rod 312 of the actuator. The other end of the rod 312 is connected to a piston 314 received within a cylinder 316 of the actuator. A side wall mounted bracket 318 includes upwardly projecting lugs 320 that receive a downwardly projecting lug 322 on the lower end of the cylinder such that a pin 324 pivotally connects the cylinder to the bracket. Pressurized fluid such as compressed air supplied to cylinder 316 moves piston 314 between the opposite ends of the cylinder so that the connecting rod 312 is extended and retracted to move the crank arm 306 and thereby pivot the control member 292 about its elongated laterally extending length. A pair of crank arms 324 secured to the opposite ends of the control member tubular portion 294 by welds 326 extend radially with respect to the elongated length of the control member. These crank arms 324 are connected to spaced links 328 by pins 330. The links 328 are also connected by pins 332 to upwardly extending projections 334 secured to the upper ends of the lifting arm support members 290 by nut and bolt connections 336. Pivotal movement of the control member 292 by the actuator 304 causes the crank arms 324 to move the lifting arm support members 290 vertically such that the lifting flanges 288 of the lifting arms 286 raise and lower the opposite ends of the product sticks. As shown by the phantom and solid line illustration of the lower conveyor 244b in FIG. 15, the lifters move the lifting arms 286 between a first lower position shown by solid lines and a second upper position shown by phantom lines to pick the product sticks upwardly off the conveyor beams 248. This lifting occurs after a forward reciprocation of the beams and the sticks are then suspended and remain suspended during a subsequent rearward beam reciprocation. Prior to another forward reciprocation of the beams 248, the lifters lower the lifting arms 286 such that the product sticks are returned to the beams ready for another forward reciprocation and consequent product advancement.

With reference to FIG. 16, each lifting arm 286 is supported by a pair of vertical guides 338 for upward and downward movement. The guides 338 at vertically aligned ends of the lifting arms 286 incorporate a common guide tube 340 that extends in a vertical direction. Each guide tube 340 has upper and lower ends fixedly secured to the adjacent ends of the upper and lower lifting arms 286 by welds 341. As also seen by reference to FIG. 17, each lower guide tube end receives a tubular plastic slide 342 and an upwardly extending guide rod 344 within in the slide. Nut and bolt connections 346 secure the lower end of rod 344 to a bracket 348 mounted on the lower channel 280. Below their upper ends, each guide tube 340 supports a tubular guide portion 350 that receives a tubular plastic slide 352 and the lower end of a downwardly projecting guide rod 354 within this slide. Nut and bolt connections 356 secure the upper ends of guide rods 354 to associated brackets 358 mounted on the upper channel 280. The guides 342 and 352 are made from plastic so that there is a low friction guiding support supplied to the associated guide rods 344 and 354 in providing a guided vertical movement of the lifting arms 280.

During the lifting of products off the conveyors 244a and 244b, the laterally extending control member 292 of the lifting mechanism as shown in FIGS. 15 and 16 is loaded in a torsional mode. The actuator 304 (FIG. 15) is located laterally with respect to the conveyors so as not to obstruct the associated treatment zone at its upper side. As such, the gas circulators 236 shown in FIG. 13 can be located immediately over their associated cooking treatment zones 234. This construction minimizes the total height of the system and facilitates its installation in pre-existing buildings.

With reference to FIG. 18, the exit end of the system 230 includes a door opening 360 and a vertically movable door 362. Lateral edges of the door are supported in a suitable sliding manner for vertical movement and an upper edge 364 of the door mounts a screw eye 366 to which a cable 368 is secured. Suitable mechanism for pulling the cable 368 to move the door 362 vertically between the lower closed position shown and an upper access position is provided. Entrance to the interior of the system is thus possible for servicing and maintenance.

While preferred embodiments of the meat processing system have herein been disclosed in detail, those skilled in the art will recognize various alternative designs and embodiments for practicing the present invention as defined by the following claims.

What is claimed is:

1. In an elongated meat processing system including a housing defining at least one treatment zone for processing meat or the like and a conveyor for conveying products to be processed through the treatment zone, an improved lifting mechanism for lifting products from the conveyor comprising: laterally spaced lifters between which the conveyor carries products to be processed through the treatment zone; each lifter being movable from a first position to a second position to lift products from the conveyor within the treatment zone and being movable from the second position back to the first position to return the lifted products to the conveyor; a rotatably supported elongated control member extending laterally with respect to the conveyor between the lifters at each side thereof and having crank arms respectively connected to the lifters so as to coordinate the movement of the lifters between the first and second positions; an actuator for rotating the control member about the elongated extent thereof to move the lifters between the first and second positions while the control member is loaded in a torsional mode; said actuator being spaced laterally with respect to the conveyor at one side thereof such that the space above the conveyor is not obstructed by the actuator; and a gas circulator for supplying circulating gas to the treatment zone and being located immediately over the upper extremity of the treatment zone.

2. A system as in claim 1 wherein the conveyor includes a pair of laterally spaced beams that carry the products and are reciprocable forwardly and rearwardly, the lifters being moved by the actuator from the first position to the second position after a forward reciprocation of the beams to lift products therefrom, and the lifters being moved by the actuator from the second position to the first position after a rearward beam reciprocation to return the products to the beams prior to a subsequent forward beam reciprocation in a manner that causes product advancement.

3. A system as in claim 2 wherein each reciprocating beam includes a positioning member defining openings for receiving sticks on which the products are supported.

4. A system as in claim 3 further including means for detachably securing each positioning member to its associated beam.

5. A system as in claim 2 further including rollers on which the beams reciprocate.

6. A system as in claim 2 wherein the control member includes an end projecting outwardly from the treatment zone, and the actuator including a cylinder positioned externally of the treatment zone and connected to the outwardly projecting end of the control member to cause the control member rotation which moves the lifters between the first and second positions.

7. A system as in claim 2 which includes a plurality of the conveyors arranged in a vertically spaced relationship with the laterally spaced beams thereof positioned above and below each other on opposite sides of the conveyors, and each lifter including vertically spaced lifting arms interconnected with each other and the control member for vertical movement as the control member is pivoted by the actuator.

8. A system as in claim 7 which includes a plurality of the lifters positioned along each side of the conveyors in respective lateral alignement with the lifters on the other side of the conveyors, and a plurality of the control members and associated actuators for connecting and moving the laterally aligned lifters to lift products from the conveyors and return the lifted products back to the conveyors.

9. A system as in claim 7 further including a load station and an unload station, each of said stations including a vertically movable framework, laterally spaced lifters mounted on the framework of each station, a control member connecting the laterally spaced lifters of each framework and an actuator for pivoting the control member of each station such that the lifters are moved to load products onto the beams at the load station and to unload products from the beams at the unload station.

10. A system as in claim 9 wherein at least one of the stations extends between different floor levels to transfer products therebetween.

11. A system as in claim 7 wherein the lifters include a pair of vertical guides for each lifting arm, and a vertical support member connecting the lifting arms at each side of the conveyors.

12. A system as in claim 11 wherein the crank arms are respectively connected to the support members of the laterally spaced lifters.

13. In an elongated meat processing system including a housing defining at least one treatment zone for processing meat or the like by a circulating gas, and a conveyor for conveying products to be processed through the treatment zone, the improvement comprising: a lifting mechanism including laterally spaced lifters located on opposite sides of the conveyor; said lifters being movable from a first position to a second position to lift products from the conveyor within the treatment zone and being movable from the second position to the first position to return the lifter products to the conveyor; a rotatably supported elongated control member extending laterally between the lifters and having crank arms respectively connected to the lifters so as to coordinate the movement thereof between the first and second positions as the control member is loaded in a torsional mode; actuator means for rotating the control member about the elongated extent thereof to move the lifters between the first and second positions so as to control the rate of advancement of the products and the time the products are present in the treatment zone; the actuator means being located laterally with respect to the conveyor so as to leave the upper extremity of the treatment zone unobstructed thereby; and a gas circulator for supplying circulating gas to the treatment zone and being located immediately over the upper extremity of the treatment zone so as to minimize the height of the system.

14. A system as in claim 13 wherein the gas circulator includes a gas blower, a pair of supply ducts for directing gas into the treatment zone; and a damper for alternately directing gas from the blower through one or the other of the ducts.

15. A system as in claim 14 wherein the gas circulator includes a return duct for recirculating a portion of the gas and an exhaust fan for exhausting a portion of the gas from the system.

16. A system as in claim 15 wherein the housing includes doors at opposite ends of the treatment zone, the conveyor including reciprocating beams from which the lifting mechanism lifts the products being processed, openings in the housing adjacent the opposite ends of the treatment zone, said openings receiving the reciprocating beams, and means communicating the openings and the exhaust fan so that the gas does not escape through the openings to an adjacent treatment zone or the environment.

17. A system as in claim 16 and also including a framework which supports the doors for slidable movement between open and closed positions, the framework including hollow members which define the openings receiving the beams and which provide the means communicating these openings with the exhaust fan.

18. A system as in claim 18 wherein the gas circulator includes a central return plenum located above the treatment zone, the supply ducts being located at opposite lateral sides of the return plenum and extending along the length of the treatment zone, an exhaust duct communicating the exhaust fan with the return plenum at one end of the treatment zone, and the return duct communicating the gas blower with the return plenum at the other end of the treatment zone.

19. In an elongated meat processing system including a housing defining at least one treatment zone for processing meat or the like, and a plurality of vertically spaced conveyors each of which includes a pair of laterally spaced reciprocating beams for conveying products to be processed through the treatment zone, an improved lifting mechanism comprising: laterally spaced lifters located at each lateral side of the treatment zone; each lifter including a lifting arm aligned with each vertically spaced conveyor; a vertical support member connecting the lifting arms of each lifter; a pair of vertical guides supporting each lifting arm for vertical movement; an elongated control member rotatably supported extending laterally between the support members at each lateral side of the treatment zone and having crank arms respectively connected to the support members of the laterally spaced lifters so as to coordinate operation thereof; and an actuator for rotating the control member along the elongated extent thereof to concurrently raise and lower the support member of each lifter such that the lifting arms connected thereto move vertically between first and second positions to lift products from the conveyor beams and return the products to the beams in a manner that controls the rate of advancement of the products and the time the products are present in the treatment zone; said actuator being spaced laterally with respect to the conveyors at one side thereof such that the space above the conveyors is not obstructed by the actuator; and a gas circulator for supplying gas to the treatment zone and being located immediately over the upper extremity of the treatment zone.

20. In an elongated meat processing system including a housing defining a plurality of treatment zones for processing meat or the like, at least one door movable between open and closed positions between two adjacent treatment zones, and a plurality of vertically spaced conveyors each of which includes a pair of laterally spaced forwardly and rearwardly reciprocating beams for conveying products to be processed through the treatment zones, the improvement comprising: a lifting mechanism including a plurality of lifters located along the length of the system at each lateral side of the treatment zones; each lifter including lifting arms positioned laterally outboard of the reciprocating conveyor beams in respective alignment therewith; a pair of vertical guides supporting each lifting arm for vertical movement; support members respectively connecting the lifting arms of each laterally spaced lifter; elongated control members supported for rotational movement about the elongated extent thereof; said control members extending between the laterally spaced lifters and including crank arms connected to the support members thereof such that rotation of the control members moves the lifting arms vertically; each control member including an end projecting outwardly through the housing and having a crank arm mounted thereon; actuators respectively connected with the crank arms on the control member ends so as to pivot the control members such that the lifting arms move vertically from a first position to a second position after a forward beam reciprocation to lift products therefrom and from the second position to the first position after a subsequent rearward beam reciprocation to return the lifted products to the beams in a manner that controls the rate of advancement of the products and the time the products are present in the treatment zones; the lifters along the length of the system allowing the leading products to be moved faster than the trailing products by maintaining the trailing products lifted from the beams during a rearward and forward reciprocation of the beams; and a gas circulator for at least one of the treatment zones, said gas circulator being located immediately over the upper extremity of the housing to minimize the height of the system.

21. A system as in claim 20 wherein the gas circulator is associated with one of the treatment zones adjacent the movable door, the housing defining openings through which the reciprocating beams move adjacent the door, and the gas circulator including an exhaust fan communicated with the openings to prevent gas flow between the zones through the openings.

22. A system as in claim 21 which includes a hollow framework that mounts the door for movement and defines the beam openings as well as communicating these openings with the exhaust fan.

* * * * *

UNITED STATES PATENT AND TRADEMARK OFFICE
CERTIFICATE OF CORRECTION

PATENT NO. : 4,136,608
DATED : January 30, 1979
INVENTOR(S) : Andrew J. Gladd et al It is certified that error appears in the above-identified patent and that said Letters Patent are hereby corrected as shown below:

Column 2, line 24 "circular" should be --circulator--.
Column 3, line 61 "circular" should be --circulator--.
Column 4, line 6 "circular" should be --circulator--.
Column 7, line 66 "withing" should be --within--.
Column 8, line 33 "storke" should be --stroke--.
Column 16, line 55 "alignement" should be --alignment--.
Column 17, line 45 after "ducts" insert --into the treatment zone.--.
Column 17, line 66 "Claim 18" should be --Claim 16--.

Signed and Sealed this

Twelfth Day of June 1979

[SEAL]

Attest:

RUTH C. MASON
Attesting Officer

DONALD W. BANNER
Commissioner of Patents and Trademarks